United States Patent
Roberts et al.

(10) Patent No.: US 11,062,342 B2
(45) Date of Patent: Jul. 13, 2021

(54) SYSTEM AND METHOD FOR TARGETED MARKETING AND CONSUMER RESOURCE MANAGEMENT

(75) Inventors: Mark E. Roberts, Santa Monica, CA (US); Jennifer K. Mathe, Irvine, CA (US); Khanh Nguyen, Lake Forest, CA (US)

(73) Assignee: Blackhawk Network, Inc., Pleasanton, CA (US)

( * ) Notice: Subject to any disclaimer, the term of this patent is extended or adjusted under 35 U.S.C. 154(b) by 325 days.

(21) Appl. No.: 12/375,377

(22) PCT Filed: Jul. 27, 2007
(Under 37 CFR 1.47)

(86) PCT No.: PCT/US2007/016922
§ 371 (c)(1),
(2), (4) Date: Nov. 30, 2009

(87) PCT Pub. No.: WO2008/013945
PCT Pub. Date: Jan. 31, 2008

(65) Prior Publication Data
US 2010/0280911 A1      Nov. 4, 2010

Related U.S. Application Data

(60) Provisional application No. 60/833,555, filed on Jul. 27, 2006.

(51) Int. Cl.
*G06Q 30/02* (2012.01)
*G06Q 20/20* (2012.01)
(Continued)

(52) U.S. Cl.
CPC ....... *G06Q 30/0233* (2013.01); *G06Q 20/202* (2013.01); *G06Q 20/227* (2013.01);
(Continued)

(58) Field of Classification Search
CPC ...... G06Q 40/00; G06Q 20/102; G06Q 20/22; G06Q 20/204; G06Q 20/227; G06Q 10/10;
(Continued)

(56) References Cited

U.S. PATENT DOCUMENTS 4,707,592 A * 11/1987 Ware .............................. 235/379
5,243,174 A *  9/1993 Veeneman et al. ........... 235/381
(Continued)

FOREIGN PATENT DOCUMENTS

WO      0068854 A2   11/2000
WO    03071386 A2    8/2003
(Continued)

OTHER PUBLICATIONS

Define: "digital", The American Heritage Science Dictionary, 2002.*
(Continued)

*Primary Examiner* — Peter Ludwig
(74) *Attorney, Agent, or Firm* — Jerry C. Harris, Jr.

(57) ABSTRACT

Systems and methods are provided for providing targeted marketing to goods and services provides and consumer resource management services to consumers. An example system and method for targeted marketing comprises collecting transaction data from point-of-sale (POS) terminals and using a consumer identifier in the transaction data to access stored information about the consumer. This information may be used to target offers and advertisement to the consumer. In an example system for consumer resource management, a consumer may configure a consumer account on the enterprise infrastructure via a web-site. The consumer may use the consumer account to purchase and configure gift cards that may be used for purchasing goods and services. A universal transaction identifier may be associated with the consumer account and used to purchase (Continued)

goods and services from more than one selected goods and services providers.

8 Claims, 22 Drawing Sheets

(51) Int. Cl.
    *G06Q 20/22*     (2012.01)
    *G06Q 20/40*     (2012.01)
    *G06Q 30/06*     (2012.01)
    *G06Q 20/34*     (2012.01)
    *G06Q 50/00*     (2012.01)

(52) U.S. Cl.
    CPC ....... *G06Q 20/342* (2013.01); *G06Q 20/4037* (2013.01); *G06Q 30/02* (2013.01); *G06Q 30/0222* (2013.01); *G06Q 30/0229* (2013.01); *G06Q 30/0234* (2013.01); *G06Q 30/0251* (2013.01); *G06Q 30/0255* (2013.01); *G06Q 30/0269* (2013.01); *G06Q 30/0621* (2013.01); *G06Q 50/01* (2013.01)

(58) Field of Classification Search
    CPC ...... G06Q 20/027; G06Q 20/18; G06Q 20/20; G06Q 20/341; G06Q 20/347
    USPC ........................................................ 705/7.12
    See application file for complete search history.

(56) References Cited

U.S. PATENT DOCUMENTS

| | | |
|---|---|---|
| 5,592,560 A | 1/1997 | Deaton et al. |
| 5,615,123 A * | 3/1997 | Davidson et al. ............ 700/233 |
| 5,649,115 A * | 7/1997 | Schrader et al. ............... 705/33 |
| 5,923,016 A | 7/1999 | Fredregill et al. |
| 5,963,924 A | 10/1999 | Williams et al. |
| 6,061,660 A | 5/2000 | Eggleston et al. |
| 6,129,274 A | 10/2000 | Suzuki |
| 6,360,139 B1 * | 3/2002 | Jacobs ......................... 700/232 |
| 6,370,514 B1 | 4/2002 | Messner |
| 6,397,198 B1 | 5/2002 | Hoffman et al. |
| 6,473,500 B1 | 10/2002 | Risafi et al. |
| 6,484,148 B1 | 11/2002 | Boyd |
| 6,606,605 B1 | 8/2003 | Kolls |
| 6,622,919 B1 * | 9/2003 | Wilz et al. ............... 235/472.01 |
| 6,671,358 B1 | 12/2003 | Seidman et al. |
| 6,748,532 B1 * | 6/2004 | Digiorgio et al. ............ 713/159 |
| 6,754,636 B1 * | 6/2004 | Walker et al. ................... 705/50 |
| 6,865,547 B1 * | 3/2005 | Brake et al. ..................... 705/41 |
| 6,886,741 B1 | 5/2005 | Salveson |
| 6,915,271 B1 | 7/2005 | Meyer et al. |
| 7,035,731 B2 | 4/2006 | Smith |
| 7,039,654 B1 | 5/2006 | Eder |
| 7,054,830 B1 | 5/2006 | Eggleston et al. |
| 7,128,261 B1 | 10/2006 | Henderson et al. |
| 7,222,090 B2 | 5/2007 | Oddo |
| 7,243,082 B1 | 7/2007 | Forlai |
| 7,290,705 B1 * | 11/2007 | Shin ............................... 235/381 |
| 7,316,350 B2 | 1/2008 | Algiene |
| 7,318,049 B2 | 1/2008 | Iannacci |
| 7,325,725 B2 * | 2/2008 | Foss, Jr. ........................ 235/380 |
| 7,328,190 B2 | 2/2008 | Smith et al. |
| 7,370,076 B2 | 5/2008 | Friedman et al. |
| 7,374,095 B2 | 5/2008 | Blank et al. |
| 7,383,213 B1 | 6/2008 | Walter |
| 7,383,988 B2 | 6/2008 | Slonecker, Jr. |
| 7,387,238 B2 * | 6/2008 | Foss et al. ..................... 235/380 |
| 7,464,862 B2 | 12/2008 | Bacastow |
| 7,477,731 B2 | 1/2009 | Tamari et al. |
| 7,494,048 B2 | 2/2009 | Gusler et al. |
| 7,496,943 B1 | 2/2009 | Goldberg et al. |
| 7,575,152 B2 * | 8/2009 | Graves et al. ................. 235/378 |
| 7,580,857 B2 * | 8/2009 | VanFleet et al. .......... 705/14.41 |
| 7,606,730 B2 | 10/2009 | Antonucci |
| 7,620,952 B2 * | 11/2009 | Havemose .................... 718/104 |
| 7,624,040 B2 | 11/2009 | Postrel |
| 7,673,327 B1 | 3/2010 | Polis et al. |
| 7,716,080 B2 | 5/2010 | Postrel |
| 7,734,527 B2 | 6/2010 | Uzo |
| 7,734,719 B2 * | 6/2010 | Friedman et al. ............ 709/217 |
| 7,788,129 B2 | 8/2010 | Antonucci et al. |
| 7,797,233 B2 | 9/2010 | Sobek |
| 7,826,923 B2 | 11/2010 | Walker et al. |
| 7,856,377 B2 | 12/2010 | Cohagan et al. |
| 7,877,605 B2 | 1/2011 | Labrou et al. |
| 7,912,751 B1 | 3/2011 | Allos |
| 7,953,630 B2 | 5/2011 | Fowler et al. |
| 7,958,049 B2 | 6/2011 | Jamison et al. |
| 7,970,678 B2 | 6/2011 | Lapsley et al. |
| 8,033,375 B2 | 10/2011 | Doran et al. |
| 8,051,008 B2 | 11/2011 | Postrel |
| 8,131,585 B2 | 3/2012 | Nicholas et al. |
| 8,195,507 B2 | 6/2012 | Postrel |
| 8,244,631 B2 | 8/2012 | Ueno et al. |
| 8,315,915 B1 | 11/2012 | Katz et al. |
| 8,321,278 B2 | 11/2012 | Haveliwala et al. |
| 8,332,313 B2 | 12/2012 | Doran et al. |
| 8,369,842 B2 | 2/2013 | Proctor et al. |
| 8,401,898 B2 | 3/2013 | Chien et al. |
| 8,403,228 B2 * | 3/2013 | Madani ......................... 235/487 |
| 8,412,566 B2 | 4/2013 | Quatse et al. |
| 8,416,259 B2 | 4/2013 | Aragaki et al. |
| 8,458,063 B2 | 6/2013 | Moore et al. |
| 8,472,594 B2 | 6/2013 | New et al. |
| 8,479,275 B1 | 7/2013 | Naseh |
| 8,479,980 B2 | 7/2013 | Paschini et al. |
| 8,495,680 B2 | 7/2013 | Bentolila et al. |
| 8,571,979 B1 | 10/2013 | Kuntz et al. |
| 8,631,999 B2 | 1/2014 | Wolfe et al. |
| 9,336,543 B2 | 5/2016 | Wagner |
| 9,852,414 B2 | 12/2017 | Llach |
| 10,163,121 B2 | 12/2018 | Roberts et al. |
| 2001/0007098 A1 | 7/2001 | Hinrichs et al. |
| 2002/0013728 A1 * | 1/2002 | Wilkman ........................ 705/14 |
| 2002/0016763 A1 | 2/2002 | March |
| 2002/0022966 A1 | 2/2002 | Horgan |
| 2002/0023027 A1 | 2/2002 | Simonds |
| 2002/0052842 A1 | 5/2002 | Schuba et al. |
| 2002/0053020 A1 | 5/2002 | Teijido et al. |
| 2002/0062249 A1 * | 5/2002 | Iannacci ................. G06Q 20/10 705/14.1 |
| 2002/0070953 A1 | 6/2002 | Barg et al. |
| 2002/0099604 A1 | 7/2002 | Lewis et al. |
| 2002/0142751 A1 | 10/2002 | Abe |
| 2002/0184086 A1 | 12/2002 | Linde |
| 2003/0004828 A1 | 1/2003 | Epstein |
| 2003/0147403 A1 | 8/2003 | Border et al. |
| 2003/0229542 A1 | 12/2003 | Morrisroe |
| 2003/0233276 A1 | 12/2003 | Pearlman et al. |
| 2003/0236704 A1 * | 12/2003 | Antonucci ...................... 705/14 |
| 2004/0030601 A1 | 2/2004 | Pond et al. |
| 2004/0045014 A1 | 3/2004 | Radhakrishnan |
| 2004/0098351 A1 * | 5/2004 | Duke ............................... 705/65 |
| 2004/0099730 A1 * | 5/2004 | Tuchler et al. ............... 235/380 |
| 2004/0122736 A1 | 6/2004 | Strock et al. |
| 2004/0133511 A1 * | 7/2004 | Smith et al. ..................... 705/39 |
| 2004/0172459 A1 | 9/2004 | Schwalm et al. |
| 2004/0181452 A1 | 9/2004 | DeLaCruz |
| 2004/0186773 A1 * | 9/2004 | George et al. .................. 705/14 |
| 2004/0210450 A1 | 10/2004 | Atencio et al. |
| 2004/0210509 A1 | 10/2004 | Eder |
| 2004/0211830 A1 | 10/2004 | Algiene |
| 2005/0008132 A1 | 1/2005 | Paschini et al. |
| 2005/0038714 A1 * | 2/2005 | Bonet et al. ..................... 705/26 |
| 2005/0071269 A1 | 3/2005 | Peters |
| 2005/0086525 A1 | 4/2005 | Cirulli et al. |
| 2005/0097039 A1 * | 5/2005 | Kulcsar et al. ................. 705/40 |
| 2005/0108654 A1 | 5/2005 | Gopalraj |
| 2005/0116027 A1 * | 6/2005 | Algiene et al. ............... 235/380 |
| 2005/0171902 A1 | 8/2005 | Nguyen |
| 2005/0197919 A1 | 9/2005 | Robertson |
| 2005/0222894 A1 * | 10/2005 | Klein et al. ..................... 705/10 |

(56) References Cited

U.S. PATENT DOCUMENTS

| | | | |
|---|---|---|---|
| 2005/0228717 | A1 | 10/2005 | Gusler et al. |
| 2005/0234822 | A1* | 10/2005 | VanFleet et al. ............... 705/44 |
| 2005/0247777 | A1* | 11/2005 | Pitroda ......................... 235/380 |
| 2005/0261968 | A1 | 11/2005 | Randall et al. |
| 2005/0278188 | A1 | 12/2005 | Thomson et al. |
| 2006/0002370 | A1 | 1/2006 | Rabie et al. |
| 2006/0069642 | A1* | 3/2006 | Doran .................... G06Q 20/10 705/39 |
| 2006/0074767 | A1 | 4/2006 | Fortney |
| 2006/0080111 | A1 | 4/2006 | Homeier-Beals |
| 2006/0095961 | A1 | 5/2006 | Govindarajan et al. |
| 2006/0111978 | A1 | 5/2006 | Tietzen et al. |
| 2006/0184386 | A1 | 8/2006 | Merritt |
| 2006/0190331 | A1 | 8/2006 | Tollinger et al. |
| 2006/0190332 | A1* | 8/2006 | Grider ............................ 705/14 |
| 2006/0206429 | A1 | 9/2006 | Martinez |
| 2006/0207856 | A1 | 9/2006 | Dean et al. |
| 2006/0208065 | A1* | 9/2006 | Mendelovich et al. ...... 235/380 |
| 2006/0224454 | A1* | 10/2006 | Kantor .................... G06Q 30/02 705/14.3 |
| 2006/0231611 | A1 | 10/2006 | Chakiris et al. |
| 2006/0255126 | A1 | 11/2006 | Hein |
| 2006/0265335 | A1 | 11/2006 | Hogan et al. |
| 2007/0005685 | A1 | 1/2007 | Chau et al. |
| 2007/0094085 | A1 | 4/2007 | Redmond et al. |
| 2007/0125840 | A1 | 6/2007 | Law et al. |
| 2007/0162338 | A1* | 7/2007 | Lawe ............................ 705/14 |
| 2007/0172063 | A1 | 7/2007 | Biggs et al. |
| 2007/0175982 | A1 | 8/2007 | Bonalle et al. |
| 2007/0187489 | A1 | 8/2007 | Martinez |
| 2007/0198432 | A1* | 8/2007 | Pitroda et al. .................. 705/64 |
| 2007/0205269 | A1 | 9/2007 | Lindon |
| 2007/0210152 | A1* | 9/2007 | Read ............................ 235/380 |
| 2007/0255678 | A1* | 11/2007 | Majumdar ....................... 707/1 |
| 2007/0255797 | A1 | 11/2007 | Dunn et al. |
| 2007/0255837 | A1 | 11/2007 | Hassan et al. |
| 2007/0272736 | A1 | 11/2007 | Brooks et al. |
| 2007/0278290 | A1 | 12/2007 | Messerges et al. |
| 2008/0041936 | A1* | 2/2008 | Vawter ......................... 235/380 |
| 2008/0072064 | A1* | 3/2008 | Franchi ........................ 713/186 |
| 2008/0104199 | A1 | 5/2008 | Kalaboukis |
| 2008/0148408 | A1 | 6/2008 | Kao et al. |
| 2008/0162271 | A1 | 7/2008 | Benjamin |
| 2008/0162299 | A1 | 7/2008 | Gusler et al. |
| 2008/0164307 | A1* | 7/2008 | Silverstein .................... 235/380 |
| 2008/0037557 | A1 | 12/2008 | Fujita et al. |
| 2009/0018915 | A1 | 1/2009 | Fisse |
| 2009/0043644 | A1* | 2/2009 | Wilkman ........................ 705/10 |
| 2009/0063530 | A1 | 3/2009 | Lee et al. |
| 2009/0106161 | A1 | 4/2009 | Alemany |
| 2009/0127331 | A1 | 5/2009 | Doki |
| 2010/0030651 | A1 | 2/2010 | Matotek et al. |
| 2010/0036743 | A1 | 2/2010 | Tamari et al. |
| 2010/0036756 | A1 | 2/2010 | Van Beek |
| 2010/0042558 | A1* | 2/2010 | Van Beek ..................... 705/500 |
| 2010/0280906 | A1 | 11/2010 | Lim et al. |
| 2010/0280911 | A1 | 11/2010 | Roberts et al. |
| 2010/0287096 | A1 | 11/2010 | Leul |
| 2010/0299221 | A1 | 11/2010 | Paschini et al. |
| 2010/0299733 | A1 | 11/2010 | Paschini et al. |
| 2010/0306113 | A1 | 12/2010 | Gray et al. |
| 2011/0105022 | A1* | 5/2011 | Vawter ......................... 455/41.1 |
| 2011/0137791 | A1 | 6/2011 | Zabawskyj et al. |
| 2011/0167002 | A1* | 7/2011 | Balasubramanian et al. .. 705/44 |
| 2011/0202402 | A1 | 8/2011 | Fowler et al. |
| 2013/0013430 | A1 | 1/2013 | Roberts et al. |
| 2013/0066701 | A1 | 3/2013 | Roberts et al. |
| 2014/0052640 | A1* | 2/2014 | Pitroda et al. .................. 705/67 |
| 2014/0214567 | A1 | 7/2014 | Llach et al. |
| 2014/0297438 | A1 | 10/2014 | Dua |
| 2017/0053302 | A1 | 2/2017 | Mason et al. |
| 2018/0165705 | A1 | 6/2018 | Schwomeyer et al. |

FOREIGN PATENT DOCUMENTS

| | | |
|---|---|---|
| WO | 2006114601 A2 | 11/2006 |
| WO | 2008013945 A2 | 1/2008 |
| WO | 2008013945 A3 | 1/2008 |
| WO | 2011085241 A1 | 7/2011 |

OTHER PUBLICATIONS

Define: "digitally", Merriam-Webster Dictionary, 2012.*
Poulton, Don (Nov. 24, 2004). Introduction to Infrastructure Security, Understanding Device Security ("Poulton").*
O'Donnell, Glenn (2002). Secure DMZ Infrastructure Management.*
Filing Receipt and Specification for patent application entitled "System and Method for Targeted Marketing and Consumer Resource Management," by Mark E. Roberts, et al., filed Mar. 14, 2013 as U.S. Appl. No. 13/828,017.
Filing Receipt and Specification for patent application entitled "System and Method for Targeted Marketing and Consumer Resource Management," by Mark E. Roberts, et al., filed Mar. 13, 2013 as U.S. Appl. No. 13/799,624.
Filing Receipt and Specification for patent application entitled "System and Method for Targeted Marketing and Consumer Resource Management," by Mark E. Roberts, et al., filed Mar. 15, 2013 as U.S. Appl. No. 13/833,817.
Filing Receipt and specification for patent application entitled "System and Method for Targeted Marketing and Consumer Resource Management," by Mark E. Roberts, et al., filed Mar. 15, 2013 as U.S. Appl. No. 13/842,540.
Foreign communication from a related counterpart application—International Preliminary Report on Patentability, PCT/US2007/016922 dated Jan. 27, 2009, 5 pages.
Foreign communication from a related counterpart application—International Search Report and Written Opinion, PCT/US2007/016922 dated Jan. 28, 2008, 5 pages.
Office Action dated Mar. 7, 2013, 14 pages, U.S. Appl. No. 13/619,664, filed Sep. 14, 2012.
Specification for provisional patent application entitled "System and Method of Targeted Marketing," by Jennifer K. Mathe, et al., filed Jul. 27, 2006 as U.S. Appl. No. 60/833,555.
Office Action (Final) dated Jun. 20, 2013 (19 pages), U.S. Appl. No. 13/619,664, filed Sep. 14, 2012.
Filing Receipt and Specification for patent application entitled "System and Method for Targeted Marketing and Consumer Resource Management," by Mark E. Roberts, et al., filed Sep. 3, 2013 as U.S. Appl. No. 14/017,114.
Filing Receipt and Specification for patent application entitled "System and Method for Targeted Marketing and Consumer Resource Management," by Mark E. Roberts, et al., filed Sep. 4, 2013 as U.S. Appl. No. 14/017,518.
"Swapagift.com Expands Its "Cash for Your Card" Program." Press Release, Dec. 31, 2003, 1 page, Vocus PRW Holdings, LLC.
Swapagift.com, "Cash for Your Card Now!," WayBack Machine: Internet Archive, Sep. 19, 2003, 1 page, Swap A Thing, Inc.
Swapagift.com, "Cash for Your Card Now!," WayBack Machine: Internet Archive, Oct. 29, 2003, 1 page, Swap A Thing, Inc.
Swapagift.com, "Cash for Your Card Now!," WayBack Machine: Internet Archive, Dec. 4, 2003, 1 page, Swapathing, Inc.
Swapagift.com, "Cash for Your Card Now!," WayBack Machine: Internet Archive, Feb. 11, 2004, 1 page, Swapathing, Inc.
Swapagift.com, "Cash for Your Card Now!," WayBack Machine: Internet Archive, Apr. 3, 2004, 1 page, Swapathing, Inc.
Swapagift.com, "Cash for Your Card Now!," WayBack Machine: Internet Archive, Apr. 14, 2004, 1 page, Swapathing, Inc.
Swapagift.com, "Cash for Your Card Now!," WayBack Machine: Internet Archive, Jun. 13, 2004, 1 page, Swapathing, Inc.
Swapagift.com, "Cash for Your Card Now!," WayBack Machine: Internet Archive, Jun. 18, 2004, 1 page, Swapathing, Inc.
Swapagift.com, "Cash for Your Card Now!," WayBack Machine: Internet Archive, Jul. 14, 2004, 1 page, Swapathing, Inc.
Swapagift.com, "Cash for Your Card Now!," WayBack Machine: Internet Archive, Jul. 15, 2004, 1 page, Swapathing, Inc.

(56) References Cited

OTHER PUBLICATIONS

Swapagift.com, "Cash for Your Card Now!," WayBack Machine: Internet Archive, Dec. 3, 2005, 1 page, Swapathing, Inc.
Swapagift.com, "Cash for Your Card Now!," WayBack Machine: Internet Archive, Dec. 10, 2005, 1 page, Swapathing, Inc.
Swapagift.com, "Cash for Your Card," WayBack Machine: Internet Archive, Dec. 12, 2005, 1 page, Swapathing, Inc.
Swapagift.com, "Cash for Your Card Now!," WayBack Machine: Internet Archive, Dec. 20, 2005, 1 page, Swapathing, Inc.
Swapagift.com, "Cash for Your Card Now!," WayBack Machine: Internet Archive, Dec. 31, 2005, 1 page, Swapathing, Inc.
Swapagift.com, "Cash for Your Card Now!," WayBack Machine: Internet Archive, Jan. 4, 2006, 1 page, Swapathing, Inc.
Swapagift.com, "Cash for Your Card Now!," WayBack Machine: Internet Archive, Jan. 5, 2006, 1 page, Swapathing, Inc.
Swapagift.com, "Cash for Your Card Now!," WayBack Machine: Internet Archive, Jan. 6, 2006, 1 page, Swapathing, Inc.
Swapagift.com, "Cash for Your Card Now!," WayBack Machine: Internet Archive, Jan. 10, 2006, 1 page, Swapathing, Inc.
Swapagift.com, "Cash for Your Card Now!," WayBack Machine: Internet Archive, Feb. 10, 2006, 1 page, Swapathing, Inc.
Swapagift.com, "Cash for Your Card Now!," WayBack Machine: Internet Archive, May 2, 2006, 1 page, Swapathing, Inc.
Swapagift.com, "Cash for Your Card Now!," WayBack Machine: Internet Archive, May 10, 2006, 1 page, Swapathing, Inc.
Swapagift.com, "Cash for Your Card Now!," WayBack Machine: Internet Archive, Jun. 24, 2006, 1 page, Swapathing, Inc.
Swapagift.com, "Cash for Your Card Now!," WayBack Machine: Internet Archive, Jul. 3, 2006, 1 page, Swapathing, Inc.
Swapagift.com, "Cash for Your Card Now!," WayBack Machine: Internet Archive, Jul. 13, 2006, 1 page, Swapathing, Inc.
Swapagift.com, "Cash for Your Card," WayBack Machine: Internet Archive, Oct. 28, 2006, 1 page.
Swapagift.com, "Cash for Your Card," WayBack Machine: Internet Archive, Nov. 5, 2006, 1 page.
Swapagift.com, "Cash for Your Card," WayBack Machine: Internet Archive, Nov. 8, 2006, 1 page.
Swapagift.com, "Cash for Your Card," WayBack Machine: Internet Archive, Nov. 14, 2006, 1 page.
Swapagift.com, "Cash for Your Card," WayBack Machine: Internet Archive, Nov. 16, 2006, 1 page.
Swapagift.com, "Cash for Your Card," WayBack Machine: Internet Archive, Nov. 18, 2006, 1 page.
Swapagift.com, "Cash for Your Card," WayBack Machine: Internet Archive, Nov. 25, 2006, 1 page.
Swapagift.com, "Cash for Your Card," WayBack Machine: Internet Archive, Dec. 8, 2006, 1 page.
Swapagift.com, "Cash for Your Card," WayBack Machine: Internet Archive, Dec. 12, 2006, 1 page.
Swapagift.com, "Cash for Your Card," WayBack Machine: Internet Archive, Dec. 17, 2006, 1 page.
Swapagift.com, "Cash for Your Card," WayBack Machine: Internet Archive, Dec. 23, 2006, 1 page.
Swapagift.com, "Cash for Your Card," WayBack Machine: Internet Archive, Dec. 31, 2006, 1 page.
Swapagift.com, "Cash for Your Card," WayBack Machine: Internet Archive, Jan. 5, 2007, 1 page.
Swapagift.com, "Cash for Your Card," WayBack Machine: Internet Archive, Jan. 15, 2007, 1 page.
Swapagift.com, "Cash for Your Card," WayBack Machine: Internet Archive, Jan. 20, 2007, 1 page.
Swapagift.com, "Cash for Your Card," WayBack Machine: Internet Archive, Jan. 25, 2007, 1 page.
Swapagift.com, "Cash for Your Card," WayBack Machine: Internet Archive, Feb. 10, 2007, 1 page.
Swapagift.com, "Cash for Your Card," WayBack Machine: Internet Archive, Feb. 18, 2007, 1 page.
Swapagift.com, "Cash for Your Card," WayBack Machine: Internet Archive, Feb. 23, 2007, 1 page.
Swapagift.com, "Cash for Your Card," WayBack Machine: Internet Archive, Mar. 16, 2007, 1 page.
Swapagift.com, "Cash for Your Card," WayBack Machine: Internet Archive, Apr. 28, 2007, 1 page.
Swapagift.com, "Cash for Your Card," WayBack Machine: Internet Archive, May 28, 2007, 1 page.
Swapagift.com, "Cash for Your Card," WayBack Machine: Internet Archive, Jun. 29, 2007, 1 page.
Advisory Action dated Aug. 28, 2013 (3 pages), U.S. Appl. No. 13/619,664, filed Sep. 14, 2012.
Office Action dated Nov. 29, 2013 (30 pages), U.S. Appl. No. 13/619,664, filed Sep. 14, 2012.
Office Action dated Dec. 24, 2013 (37 pages), U.S. Appl. No. 13/842,540, filed Mar. 15, 2013.
Office Action dated Jan. 16, 2014 (33 pages), U.S. Appl. No. 14/017,114, filed Sep. 3, 2013.
Office Action (Final) dated Jun. 24, 2014 (21 pages), U.S. Appl. No. 13/842,540, filed Mar. 15, 2013.
Advisory Action dated Jul. 17, 2014 (2 pages), U.S. Appl. No. 14/017,114, filed Sep. 3, 2013.
Office Action (Final) dated Mar. 13, 2014 (24 pages), U.S. Appl. No. 13/619,664 field Sep. 14, 2012.
Provisional Application Cover Sheet and Specification for provisional application entitled "System and Method of Targeted Marketing," by Jennifer K. Mathe, et al., filed Jul. 27, 2006 as U.S. Appl. No. 60/833,555.
Filing Receipt and Specification for patent application entitled "System and Method for Targeted Marketing and Consumer Resource Management," by Mark E. Roberts, et al., filed Apr. 15, 2014 as U.S. Appl. No. 14/253,364.
Filing Receipt and Specification for provisional application entitled "System and Method for Selecting, Distributing, Redeeming, and Reconcling Digital Offers," by Sean Anderson, et al., filed Mar. 15, 2013 as U.S. Appl. No. 61/794,470.
Filing Receipt and Specification for patent application entitled "System and Method for Selecting, Distributing, Redeeming, and Reconciling Digital Offers," by Sean Anderson, et al., filed Mar. 14, 2014 as U.S. Appl. No. 14/213,693.
Filing Receipt and Specification for patent application entitled "Transaction Processing Platform for Facilitating Electronic Distribution of Plural Prepaid Services," by Roni Dolev Tamari, et al., filed Dec. 18, 2008 as U.S. Appl. No. 12/338,854.
Office Action (Final) dated May 8, 2014 (19 pages), U.S. Appl. No. 14/017,114, filed Sep. 3, 2013.
Office Action dated Feb. 18, 2015 (63 pages), U.S. Appl. No. 13/799,624, filed Mar. 13, 2013.
Office Action dated Feb. 20, 2015 (56 pages), U.S. Appl. No. 14/017,518, filed Sep. 4, 2013.
Office Action dated Feb. 18, 2015 (54 pages), U.S. Appl. No. 14/253,364, filed Apr. 15, 2014.
Advisory Action dated Sep. 5, 2014 (2 pages), U.S. Appl. No. 13/842,540, filed Mar. 15, 2013.
Office Action dated Nov. 18, 2014 (9 pages), U.S. Appl. No. 13/833,817, filed Mar. 15, 2013.
Office Action dated Feb. 2, 2015 (24 pages), U.S. Appl. No. 14/017,114, filed Sep. 3, 2013.
Office Action dated Jan. 5, 2015 (29 pages), U.S. Appl. No. 13/619,664, filed Sep. 14, 2012.
Office Action dated Apr. 17, 2015 (73 pages), U.S. Appl. No. 13/670,124, filed Nov. 6, 2012.
Office Action dated Apr. 29, 2015 (68 pages), U.S. Appl. No. 13/828,017, filed Mar. 14, 2013.
Office Action dated Apr. 30, 2015 (36 pages), U.S. Appl. No. 13/842,540, filed Mar. 15, 2013.
Office Action (Final) dated May 12, 2015 (27 pages), U.S. Appl. No. 13/619,664, filed Sep. 14, 2012.
Office Action (Final) dated May 13, 2015 (13 pages), U.S. Appl. No. 14/017,114, filed Sep. 3, 2013.
Office Action (Final) dated May 29, 2015 (27 pages), U.S. Appl. No. 14/017,518, filed Sep. 4, 2013.
Office Action dated Jun. 22, 2015 (61 pages), U.S. Appl. No. 13/833,817, filed Mar. 15, 2013.

(56) References Cited

OTHER PUBLICATIONS

Office Action dated Jun. 23, 2015 (31 pages), U.S. Appl. No. 14/253,364, filed Apr. 15, 2014.
Office Action (Final) dated Jun. 24, 2015 (20 pages), U.S. Appl. No. 13/799,624, filed Mar. 13, 2013.
Advisory Action dated Jul. 17, 2015 (6 pages), U.S. Appl. No. 13/619,664, filed Sep. 14, 2012.
Advisory Action dated Jul. 17, 2015 (5 pages), U.S. Appl. No. 14/017,114, filed Sep. 3, 2013.
Office Action dated Oct. 1, 2015 (16 pages), U.S. Appl. No. 13/619,664, filed Sep. 14, 2012.
Office Action (Final) dated Sep. 16, 2015 (21 pages), U.S. Appl. No. 13/828,017, filed Mar. 14, 2013.
Advisory Action dated Sep. 1, 2015 (4 pages), U.S. Appl. No. 13/799,624, filed Mar. 13, 2013.
Office Action (Final) dated Sep. 1, 2015 (24 pages), U.S. Appl. No. 13/670,124, filed Nov. 6, 2012.
Advisory Action dated Nov. 6, 2015 (2 pages), U.S. Appl. No. 13/670,124, filed Nov. 6, 2012.
Advisory Action dated Nov. 20, 2015 (2 pages), U.S. Appl. No. 13/828,017, filed Mar. 14, 2013.
Advisory Action dated Sep. 1, 2015 (3 pages), U.S. Appl. No. 13/833,817, filed Mar. 15, 2013.
Office Action (Final) dated Aug. 10, 2015 (20 pages), U.S. Appl. No. 13/842,540, filed Mar. 15, 2013.
Advisory Action dated Oct. 15, 2015 (3 pages), U.S. Appl. No. 13/842,540, filed Mar. 15, 2013.
Office Action dated Jan. 29, 2016 (19 pages), U.S. Appl. No. 13/842,540, filed Mar. 15, 2013.
Office Action dated Sep. 3, 2015 (21 pages), U.S. Appl. No. 14/017,114, filed Sep. 3, 2013.
Advisory Action dated Aug. 10, 2015 (5 pages), U.S. Appl. No. 14/017,518, filed Sep. 4, 2013.
Office Action dated Nov. 3, 2015 (21 pages), U.S. Appl. No. 14/017,518, filed Sep. 4, 2013.
Office Action dated Jan. 12, 2016 (76 pages), U.S. Appl. No. 14/213,693, filed Mar. 14, 2014.
Office Action (Final) dated Feb. 11, 2016 (19 pages), U.S. Appl. No. 13/619,664, filed Sep. 14, 2012.
Office Action dated Mar. 8, 2016 (22 pages), U.S. Appl. No. 13/670,124, filed Nov. 6, 2012.
Office Action dated Mar. 2, 2016 (19 pages), U.S. Appl. No. 13/799,624, filed Mar. 13, 2013.
Office Action dated Mar. 3, 2016 (22 pages), U.S. Appl. No. 13/833,817, filed Mar. 15, 2013.
Office Action (Final) dated Feb. 3, 2016 (13 pages), U.S. Appl. No. 14/017,114, filed Sep. 3, 2013.
Office Action (Final) dated Mar. 31, 2016 (13 pages), U.S. Appl. No. 14/017,518, filed Sep. 4, 2013.
Office Action dated Jun. 21, 2016 (21 pages), U.S. Appl. No. 13/619,664, filed Sep. 14, 2012.
Advisory Action dated May 26, 2016 (3 pages), U.S. Appl. No. 14/017,114, filed Sep. 3, 2013.
Advisory Action dated Jun. 6, 2016 (3 pages), U.S. Appl. No. 14/017,518, filed Sep. 4, 2013.
Office Action dated May 25, 2016 (16 pages), U.S. Appl. No. 14/253,364, filed Apr. 15, 2014.
Office Action (Final) dated May 17, 2016 (20 pages), U.S. Appl. No. 14/213,693, filed Mar. 14, 2014.
Advisory Action dated Jul. 29, 2016 (3 pages), U.S. Appl. No. 14/213,693, filed Mar. 14, 2014.
Varadarajan, Suba, "Virtual Local Area Networks," http://www.cse.wustl.edu/~jain/cis788-97/ftp/virtual_lans/, Aug. 14, 1997, pp. 1-12.
Office Action (Final) dated Sep. 1, 2016 (30 pages), U.S. Appl. No. 13/670,124, filed Nov. 6, 2012.
Office Action dated Sep. 23, 2016 (12 pages), U.S. Appl. No. 13/828,017, filed Mar. 14, 2013.
Office Action (Final) dated Aug. 30, 2016 (24 pages), U.S. Appl. No. 13/799,624, filed Mar. 13, 2013.
Office Action (Final) dated Sep. 7, 2016 (19 pages), U.S. Appl. No. 13/833,817, filed Mar. 15, 2013.
Office Action (Final) dated Sep. 26, 2016 (34 pages), U.S. Appl. No. 13/842,540, filed Mar. 15, 2013.
Office Action dated Sep. 8, 2016 (28 pages), U.S. Appl. No. 14/017,114, filed Sep. 3, 2013.
Advisory Action dated Nov. 8, 2016 (3 pages), U.S. Appl. No. 13/799,624, filed Mar. 13, 2013.
Office Action (Final) dated Nov. 17, 2016 (44 pages), U.S. Appl. No. 14/253,364, filed Apr. 15, 2014.
Office Action (Final) dated Dec. 19, 2016 (24 pages), U.S. Appl. No. 13/619,664, filed Sep. 14, 2012.
Office Action (Final) dated Jan. 27, 2017 (21 pages), U.S. Appl. No. 13/828,017, filed Mar. 14, 2013.
Advisory Action dated Dec. 8, 2016 (2 pages), U.S. Appl. No. 13/833,817, filed Mar. 15, 2013.
Office Action (Final) dated Jan. 11, 2017 (21 pages), U.S. Appl. No. 14/017,114, filed Sep. 3, 2013.
Office Action dated Jan. 10, 2017 (34 pages), U.S. Appl. No. 14/017,518, filed Sep. 4, 2013.
Advisory Action dated Jan. 24, 2017 (3 pages), U.S. Appl. No. 14/253,364, filed Apr. 15, 2014.
Office Action dated Jun. 12, 2017 (26 pages), U.S. Appl. No. 13/670,124, filed Nov. 6, 2012.
Advisory Action dated Apr. 3, 2017 (3 pages), U.S. Appl. No. 13/828,017, filed Mar. 14, 2013.
Office Action dated May 17, 2017 (25 pages), U.S. Appl. No. 13/799,624, filed Mar. 13, 2013.
Notice of Allowance dated Jun. 14, 2017 (12 pages), U.S. Appl. No. 13/833,817, filed Mar. 15, 2013.
Advisory Action dated Dec. 8, 2016 (3 pages), U.S. Appl. No. 13/842,540, filed Mar. 15, 2013.
Advisory Action dated Mar. 17, 2017 (3 pages), U.S. Appl. No. 14/017,114, filed Sep. 3, 2013.
Office Action (Final) dated Apr. 27, 2017 (28 pages), U.S. Appl. No. 14/017,518, filed Sep. 4, 2013.
Filing Receipt and Specification for patent application entitled "System and Method for Targeted Marketing and Consumer Resource Management," by Mark E. Roberts, et al., filed Sep. 7, 2017 as U.S. Appl. No. 15/697,712.
Filing Receipt and Specification for patent application entitled "System and Method for Targeted Marketing and Consumer Resource Management," by Mark E. Roberts, et al., filed Sep. 11, 2017 as U.S. Appl. No. 15/700,698.
Filing Receipt and Specification for patent application entitled "System and Method for Targeted Marketing and Consumer Resource Management," by Mark E Roberts, et al., filed Sep. 11, 2017 as U.S. Appl. No. 15/700,915.
Notice of Allowance dated Jul. 18, 2017 (13 pages), U.S. Appl. No. 13/619,664, filed Sep. 14, 2012.
Office Action (Final) dated Oct. 10, 2017 (22 pages), U.S. Appl. No. 13/670,124, filed Nov. 6, 2012.
Office Action (Final) dated Sep. 26, 2017 (12 pages), U.S. Appl. No. 13/799,624, filed Mar. 13, 2013.
Office Action dated Jul. 7, 2017 (24 pages), U.S. Appl. No. 13/842,540, filed Mar. 15, 2013.
Notice of Allowance dated Aug. 22, 2017 (13 pages), U.S. Appl. No. 14/017,114, filed Sep. 3, 2013.
Advisory Action dated Jul. 18, 2017 (3 pages), U.S. Appl. No. 14/017,518, filed Sep. 4, 2013.
Filing Receipt and Specification for patent application entitled "System and Method for Targeted Marketing and consumer Resource Management," by Mark E. Roberts, et al., filed Oct. 3, 2017 as U.S. Appl. No. 15/724,006.
Advisory Action dated Dec. 14, 2017 (3 pages), U.S. Appl. No. 13/670,124, filed Nov. 6, 2012.
Office Action (Final) dated Nov. 30, 2017 (30 pages), U.S. Appl. No. 13/828,017, filed Mar. 14, 2013.
Advisory Action dated Feb. 5, 2018 (2 pages), U.S. Appl. No. 13/828,017, filed Mar. 14, 2013.
Advisory Action dated Dec. 5, 2017 (3 pages), U.S. Appl. No. 13/799,624, filed Mar. 13, 2013.

(56) References Cited

OTHER PUBLICATIONS

Office Action dated Jan. 18, 2018 (13 pages), U.S. Appl. No. 13/842,540, filed Mar. 15, 2013.
Office Action dated Nov. 6, 2017 (19 pages), U.S. Appl. No. 14/253,364, filed Apr. 15, 2014.
Office Action dated Jan. 17, 2018 (51 pages), U.S. Appl. No. 15/724,006, filed Oct. 3, 2017.
Office Action dated Apr. 13, 2017 (45 pages), U.S. Appl. No. 14/213,693, filed Mar. 14, 2014.
Filing Receipt and Specification for patent application entitled "Client Directed Pre-Paid Card," by J. DuWayne Milner, filed Mar. 14, 2013 as U.S. Appl. No. 61/781,667.
Filing receipt and specification for provisional patent application entitled "System for Processing, Activating and Redeeming Value Added Prepaid Cards," by Teri Llach, filed Jan. 8, 2010 as U.S. Appl. No. 61/293,413.
Filing receipt and specification for provisional patent application entitled "Enhanced Rebate Program" by Rodney Mason, et al., filed Nov. 3, 2015 as U.S. Appl. No. 62/250,257.
Filing receipt and specification for provisional patent application entitled "Systems and Methods for Providing Instant Rebates to Customers" by Jason Schwomeyer, et al., filed Feb. 9, 2017 as U.S. Appl. No. 62/456,891.
Office Action dated Jul. 5, 2018 (27 pages), U.S. Appl. No. 13/799,624, filed Mar. 13, 2013.
Office Action (Final) dated Jul. 31, 2018 (78 pages), U.S. Appl. No. 13/842,540, filed Mar. 15, 2013.
Notice of Allowance dated Aug. 30, 2018 (8 pages), U.S. Appl. No. 15/124,006, filed Oct. 3, 2017.
Office Action dated Sep. 10, 2018 (35 pages), U.S. Appl. No. 14/213,693, filed Mar. 14, 2014.
Office Action dated Mar. 26, 2018 (33 pages), U.S. Appl. No. 14/017,518, filed Sep. 4, 2013.
Office Action (Final) dated Apr. 11, 2018 (14 pages), U.S. Appl. No. 14/253,364, filed Apr. 15, 2014.
Advisory Action dated Jun. 14, 2018 (3 pages), U.S. Appl. No. 14/253,364, filed Apr. 15, 2014.
Office Action (Final) dated Jun. 8, 2018 (10 pages), U.S. Appl. No. 15/724,006, filed Oct. 3, 2017.
Office Action dated Sep. 24, 2018 (30 pages), U.S. Appl. No. 13/670,124, filed Nov. 6, 2012.
Office Action (Final) dated Jan. 23, 2019 (24 pages), U.S. Appl. No. 13/670,124, filed Nov. 6, 2012.
Office Action dated Sep. 26, 2018 (27 pages), U.S. Appl. No. 13/828,017, filed Mar. 14, 2013.
Office Action (Final) dated Feb. 15, 2019 (20 pages), U.S. Appl. No. 13/828,017, filed Mar. 14, 2013.
Office Action (Final) dated Nov. 8, 2018 (13 pages), U.S. Appl. No. 13/799,624, filed Mar. 13, 2013.
Advisory Action dated Jan. 16, 2019 (3 pages), U.S. Appl. No. 13/799,624, filed Mar. 13, 2013.
Advisory Action dated Oct. 29, 2018 (3 pages), U.S. Appl. No. 13/842,540, filed Mar. 15, 2013.
Office Action dated Dec. 27, 2018 (10 pages), U.S. Appl. No. 13/842,540, filed Mar. 15, 2013.
Office Action (Final) dated Sep. 20, 2018 (22 pages), U.S. Appl. No. 14/017,518, filed Sep. 4, 2013.
Advisory Action dated Nov. 27, 2018 (3 pages), U.S. Appl. No. 14/017,518, filed Sep. 4, 2013.
Office Action dated Jan. 7, 2019 (72 pages), U.S. Appl. No. 15/697,712, filed Jan. 7, 2019.

* cited by examiner

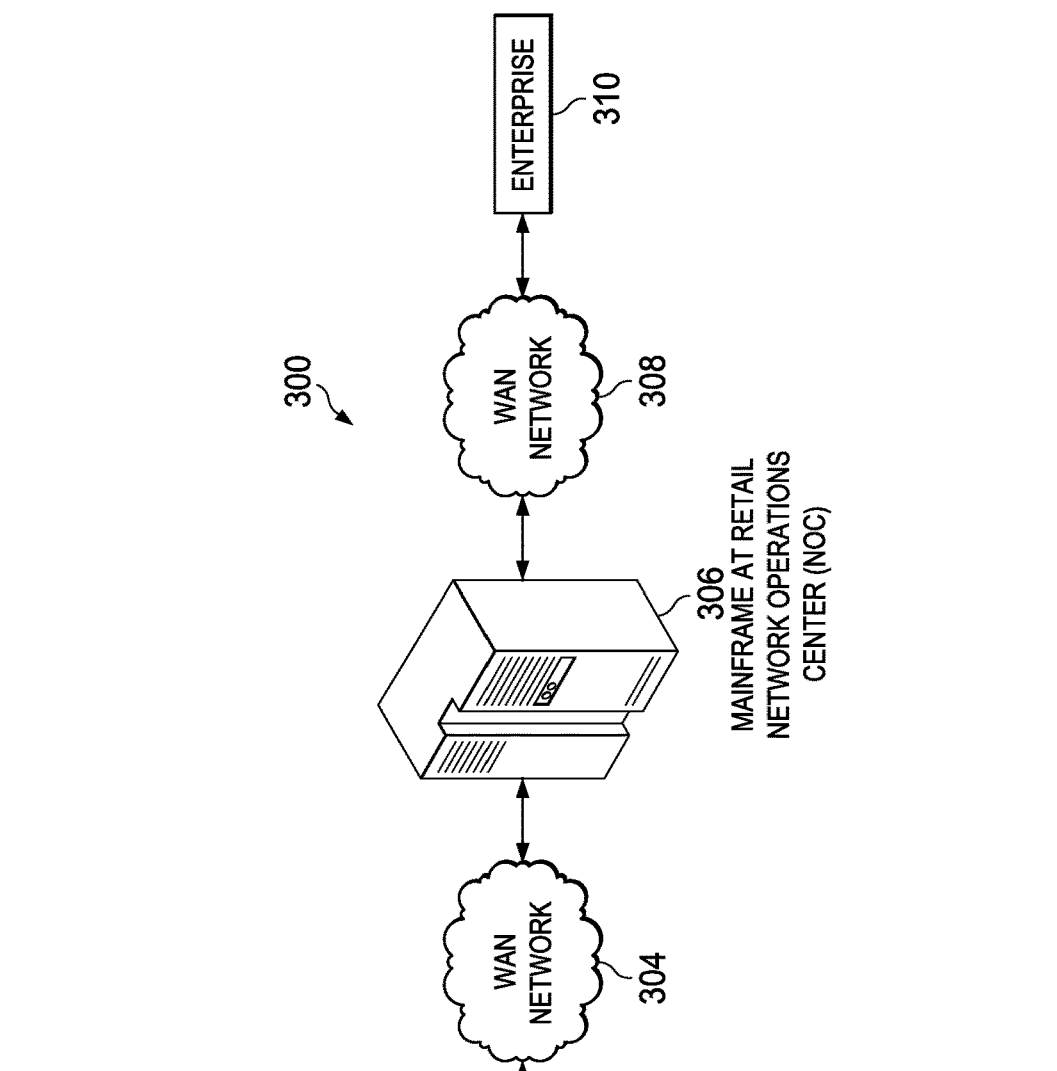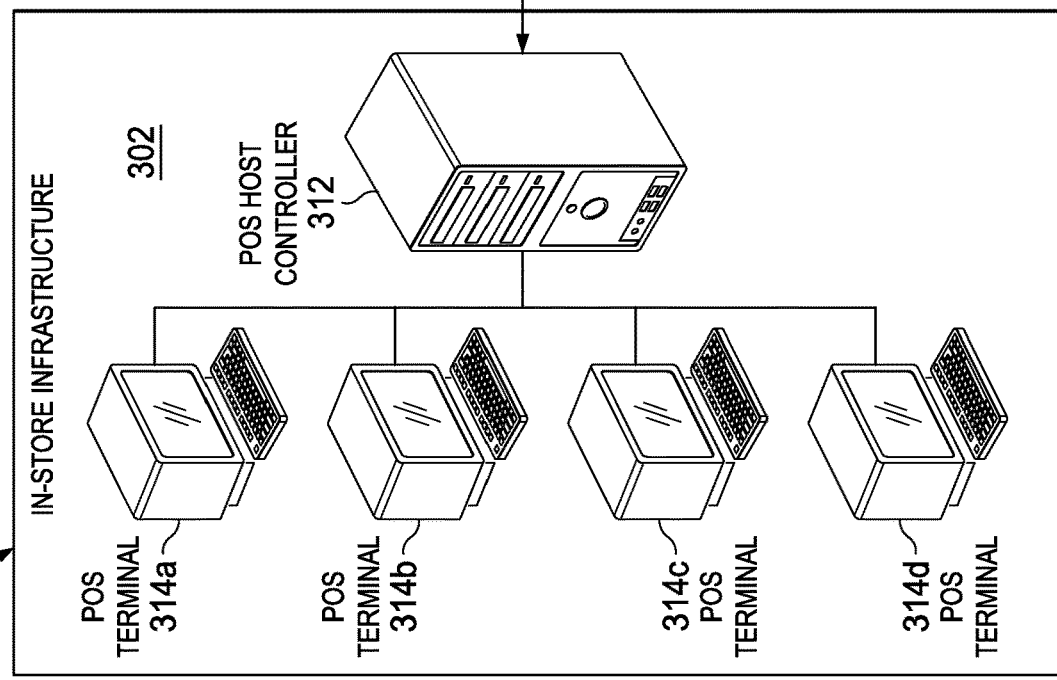
FIG. 3

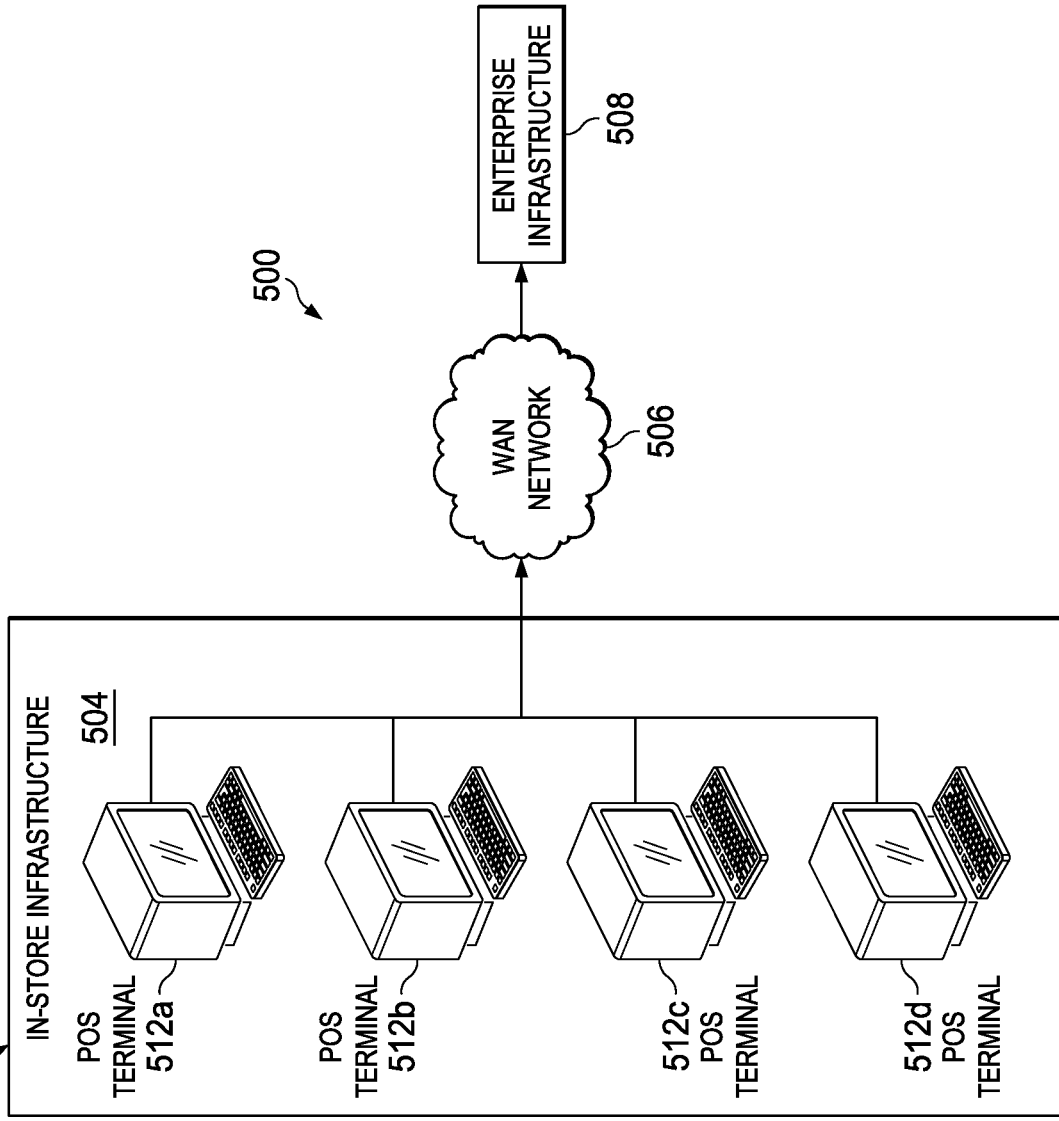

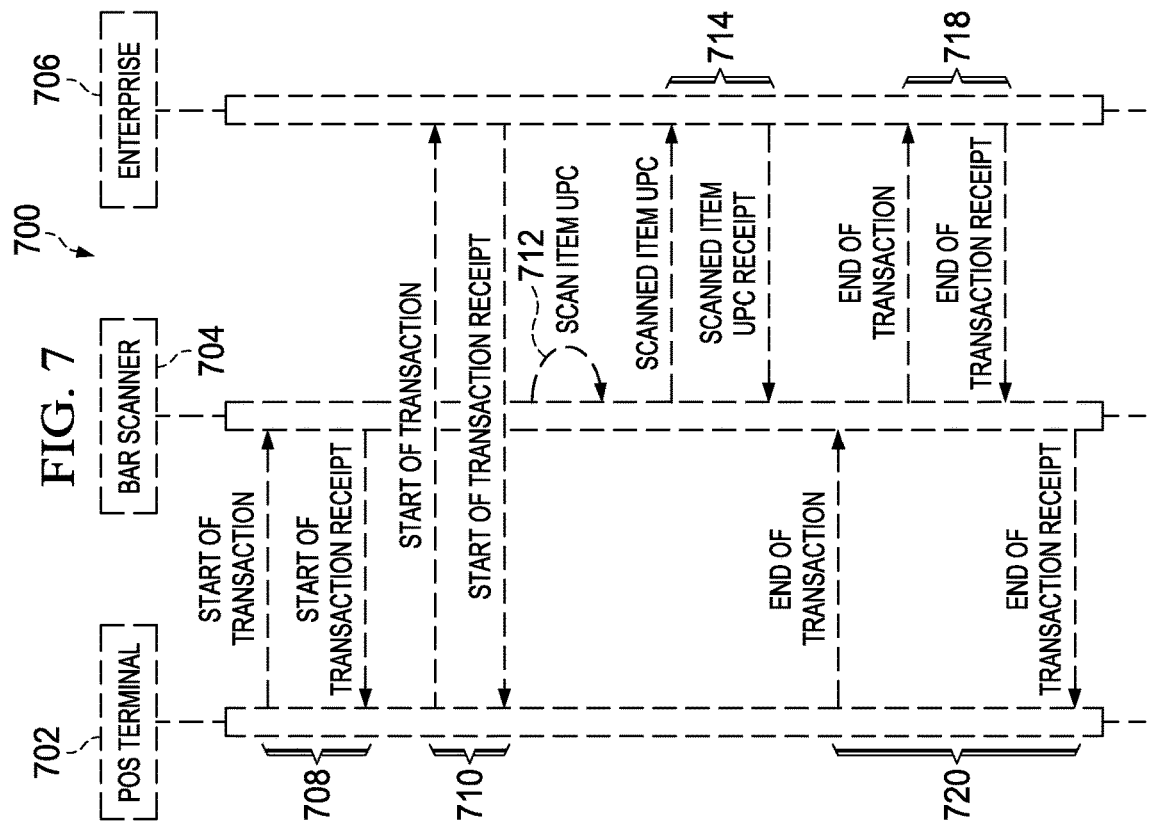
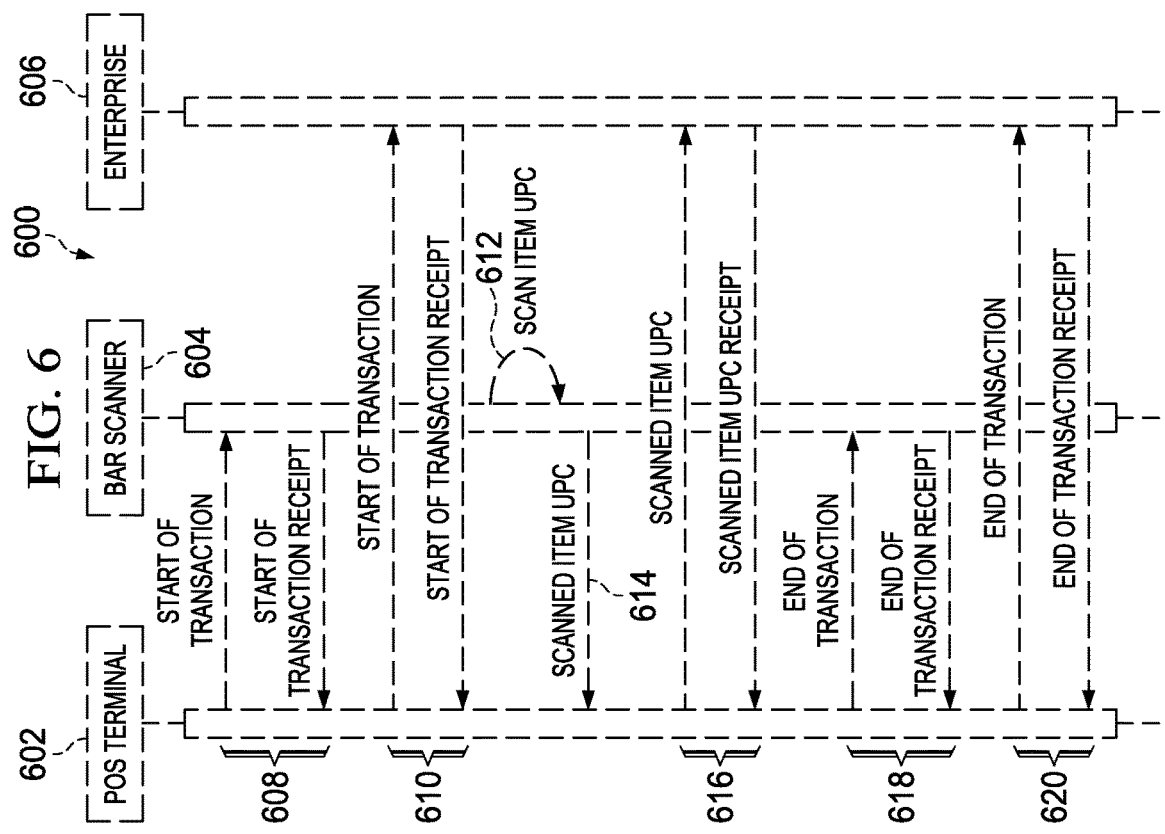

FIG. 10 leverage
▷ Hello leverage!

| My Messages | My Profile | Friends & Family | My Calendar |

Product Showcase — Search: [ ]

leverageZONE

Tabs: View Offers & Savings | Purchase Gift Cards | Gift Card Exchange | Store Credit Exchange | Rebates & Redemption | Community Activities

SPECIAL OFFERS

AVAILABLE OFFERS click & then drag into wallet — 1004

Transparent Targeting: ○
- [D] emographics  [R] ecent use
- [Z] ipcode  [E] vent reminder  [T] ravel Calendar
- [P] sychographics  [G] ift card/Store Credits  [W] ord of Mouth

| Subject | Vendor | Overview | Expires | Targeting |
|---|---|---|---|---|
| ☐ | Discovery Channel | 20% off any purchase of toys or games | 05-31-2007 | [L] |
| ☐ | Macy's | 20% off Men's designer t-shirts | 06-01-2007 | [D] [P] [Z] [L] |

☆macy's — Loyalty Member Since Oct. '00

Description: Men's: 20% off designer t-shirts

| 123456789 | SAVE TO WALLET | DELETE |

| ☐ | Office Depot | 40% off of your next furniture purchase | 07-01-2007 | [R] [G] |

---

OVERVIEW my Messages —more—
② The Gift Card you purchased is now in your wallet
2 New Messages ———— (Go)

my Profile
Keep my retailer preferences, interests and personal information updated here! (Go)

my Family & Friends (Go)

eGIFT-MINDERS
dates To Remember
3 dates coming up! (Go)

1002

---

▷ myWALLET — Overview — 1006

Tabs: My Gift Cards | Purchase Gift Cards | My Special Offers | My Loyalty Programs | My Store Credits | My Receipts ADD NEW ITEM TO myWALLET
◁ Drag & drop gift card, offer, coupon or 123 to this 4567

▷ my GIFT CARDS — (Go)
[BUY A GIFT CARD] [ADD A GIFT CARD]
☆macy's  Office DEPOT  GAP my WATCHING — (Go)
Macy's - Bargain Buy

▷ my SPECIAL OFFERS — (Go)
☆macy's  20% off Men's designer t-shirts

▷ my LOYALTY PROGRAMS — (Go)
BEST BUY Rewards Zone

▷ my STORE CREDITS — (Go)
Discovery Channel  Store Credit

▷ my RECEIPTS — (Go)
Office DEPOT  Office Depot

1000

FIG. 12 leverage

▷ Hello leverage!

| My Messages | My Profile | Friends & Family | My Calendar |

*Product Showcase*   Search: [        ▶]

leverageZONE

| View Offers & Savings | Purchase Gift Cards | Gift Card Exchange | Store Credit Exchange | Rebates & Redemption | Community Activities |

PURCHASE GIFT CARDS

Easy ④ step process! BEST ONLINE GIFT CARD SELECTION 123456789 PURCHASED & 456789 EASY & CONVENIENT — 1004

1 Choose Recipient    2 Choose Retailer and Value    3 Payment Info    4 Confirmation

CHOOSE RETAILER AND VALUE

Purchase from retailer for the 987642 12345688: [ 9874561 and ]     [ 123458 ]

- or - ▷ 1123546789 456789 9876 5 987654321     [ 951463 ]

[ EXPAND LIST ]

| SELECT | RETAILER | SELECT | RETAILER | SELECT | RETAILER |
|---|---|---|---|---|---|
| O | macy's | O | Office DEPOT | O | BEST BUY |
| O | Discovery | O | GAP | O | 24 FITNESS |

Personalized Gift Card Value
Include the dollar amount for the card purchased
(Please do not include cents)

▷ [ SELECT ]

[ << BACK ]     [ NEXT >> ]

---

OVERVIEW

*my Messages* —more—
② The Gift Card you purchased is now in your wallet
2 New Messages ———  (Go)

*my Profile*
Keep my retailer preferences, interests and personal information updated here!  (Go)

*my Family & Friends*  (Go)

*e GIFT-MINDERS*   *dates To Remember*
3 dates coming up!

1002 ↗

---

▷ myWALLET  [ Overview ▽ ]  ← 1006

| My Gift Cards | My Special Offers | My Loyalty Programs | My Store Credits | My Receipts |

ADD NEW ITEM TO myWALLET
▷ Drag & drop gift card, offer, coupon or 123 to this 4567   (Go)

▷ my GIFT CARDS    [ BUY A GIFT CARD ] [ ADD A GIFT CARD ]

[ macy's ]   [ Office DEPOT ]   [ GAP ]   (Go)

my WATCHING
Macy's - Bargain Buy

▷ my SPECIAL OFFERS
[ macy's ] 20% off Men's designer t-shirts   (Go)

▷ my LOYALTY PROGRAMS
[ BEST BUY ] Rewards Zone   (Go)

▷ my STORE CREDITS
[ Discovery ] Discovery Channel   Store Credit   (Go)

▷ my RECEIPTS
[ Office DEPOT ] Office Depot   (Go)

1000 ↗

FIG. 16 leverage

△ Hello leverage!

| My Messages | My Profile | Friends & Family | My Calendar |

OVERVIEW

*my Messages*

(2) The Gift Card you purchased is now in your wallet -more-

2 New Messages — Go

*my Profile*

Keep my retailer preferences, interests and personal information updated here! Go

*my Family & Friends* e GIFT-MINDERS Go dates To Remember 3 dates coming up!

1002 →

*Product Showcase* — Search: [ ]

leverageZONE

| View Offers & Savings | Purchase Gift Cards | Gift Card Exchange | Store Credit Exchange | Rebates & Redemption | Community Activities |

— reward zone —

| GREAT OFFERS | SHOPPING REWARDS | MY ACCOUNT |

1004

Home | Program Details

Hello, John Smith
ID No: 12345678
555 555 45687
Set Up

Reward Points Balance
22,278

Reward Point Used
0

Member 78945
85214785
12/31/2005

95415 51561
1564889
1594891593369966 1
15626481 5626
View Details

Sign Out

BEST BUY

Shopping just got more rewarding.

Easy to join
It's easy to join the Reward Zone4/ program. Stop by any participating Best Buy store (sign-up not available online). It's just 19.95 for a one year membership.

Get the Points
You'll automatically receive 100 points for nearly every dollar you spend in store and online.... -more-

How easy is it to earn rewards? See for yourself.

| Eligible Purchase | Points | Reward Certificates |
|---|---|---|
| $150 | 10,000 | $5 |
| $300 | 20,000 | $10 |
| $450 | 40,000 | $15 |
| $750 | 70,000 | $20 |
| $1,200 | 120,000 | $25 |

Earn Double Points at GoodDeal.com
Enter your 10-digit Member ID during the checkout process - it's right on the back of your membership card.

More than Rewards.

△ myWALLET                                                    Overview

| My Gift Cards | My Special Offers | My Loyalty Programs | My Store Credits | My Receipts |

ADD NEW ITEM TO myWALLET
▽ Drag & drop gift card, offer, coupon or 123 to this 4567

[456 9874 12 7894561]  Go

△ my LOYALTY PROGRAMS

BEST BUY — Best Buy                Go chili's — Chili's                  Go

24 FITNESS — 24 Hour Fitness       Go

Disneyland — Disneyland            Go

← 1006

1000 →

SYSTEM AND METHOD FOR TARGETED MARKETING AND CONSUMER RESOURCE MANAGEMENT

BACKGROUND OF THE INVENTION

1. Field of the Invention

The present invention relates to systems and methods for using computer network technology to provide consumers with resource management capabilities and to provide retailers, service providers and manufacturers with enhanced marketing channels.

2. Description of Related Art

The Internet has evolved into an entire marketplace offering consumers the ability to shop for goods and services and make transactions electronically without leaving their home. The Internet has also expanded distribution channels and ways of reaching consumers through advertising for retailers, service providers and manufacturers. The Internet and a number of more evolutionary technologies have also evolved to provide retailers, service providers and manufacturers ("retailers") with ways to attract consumers to their traditional sources of goods. For example, many retailers sell gift cards that may be redeemed at the retailers' stores for a predetermined amount. Many retailers have also established loyalty programs, or awards programs, and some have provided consumers with access to accounts over the Internet. Retailers have also used the Internet to provide consumers with coupons, and directed notices of offers and savings. Retailers may obtain Marketing information about consumers to help them determine what's selling and what's not.

Despite the revolutionary growth of the Internet as a market place, there are frustrations faced by both consumers and retailers alike. Consumer frustration primarily centers on resource management issues (managing information, gift cards, coupons, receipts, spam, loyalty program cards, rebates, etc). While gift cards have become popular, they've also become a source of confusion and clutter. A consumer cannot know the balance on most gift cards without visiting the store, and often, a consumer will have many gift cards from a wide variety of retailers. Keeping track of the gift cards requires meticulous record-keeping. Many gift cards often end up being unused, providing no advantage to the consumer and little advantage to the retailer. In addition to gift cards, consumers often experience frustration with having to store receipts, or receiving unsolicited offers by email, or having to keep track of many passwords to access many accounts for loyalty programs or award programs.

Retailer frustration centers on having poor access to consumer attention and information. Consumers faced with an overwhelming number of offers and ads find it difficult to take advantage of such offers and ads leaving retailers clueless as to how successful their campaigns are, or what products are selling as a result of the campaigns, or who is buying what products. Furthermore, retailers often direct a campaign to a particular consumer that is wholly uninterested in the product or service, or is uninterested at that particular time. Retailers generally over communicate with consumers, hoping to catch them at a time when they will be interested, leading to consumers being inundated with irrelevant communications. These frustrations are not only related but are literally caused by the opposing party. Trying to solve the needs of one without simultaneously addressing the needs of the other is an exercise in futility.

There is a need for consumers to manage and consolidate shopping resources. In addition, a need exists to provide retailers with access to consumers in an informed and focused way. There is a need as well for systems and methods that would accomplish both improved consumer resource management and improved access to those consumers for retailers.

SUMMARY

In view of the above, methods are provided for consumer resource management. In accordance to one example method, a consumer interface is provided on a network terminal available to a consumer. The consumer provides consumer input at the network terminal and the consumer input is communicated to an enterprise infrastructure. A consumer account is configured based on the consumer input at the enterprise infrastructure. The consumer account includes a partner interface to access a plurality of selected goods and services providers. The consumer account is also configured to set fund balances for at least one selected goods and services provider. The consumer then purchases a gift card from the enterprise infrastructure to enable purchases from at least one selected goods and services provider.

In another aspect of the invention, another example of a method for providing consumer resource management includes generating a universal transaction identifier from the enterprise infrastructure, the universal transaction identifier corresponding to the consumer account to enable purchases from a plurality of the selected goods and services providers.

In another aspect of the invention, a method is provided for targeted marketing by a goods and services provider. According to the example method, transaction data is collected from point-of-sale (POS) terminals processing transactions. The transaction data includes a consumer identifier for each consumer involved in the transactions. The transaction data is sent to an enterprise infrastructure. For each transaction, a consumer account is accessed in the enterprise infrastructure for each consumer based on the consumer identifiers. The transaction data is then recorded in the corresponding consumer accounts. The goods and services provider is provided with the information relating to consumers that purchased goods and services from the goods and services provider. The goods and services provider may then use the information to target consumers to receive offers, coupons, and savings.

Various advantages, aspects and novel features of the present invention, as well as details of an illustrated embodiment thereof, will be more fully understood from the following description and drawings.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 3 is a schematic diagram depicting an example of a retail partner infrastructure.

FIG. 5 is a schematic diagram depicting another example of a retail partner infrastructure.

FIG. 6 is a flow diagram depicting operation of an example of a Point-of-Sale (POS) terminal interface.

FIG. 7 is a flow diagram depicting operation of another example of a POS terminal interface.

FIG. 10 is an example of a user interface that may be implemented for use by a consumer and which provides targeted offers to particular consumers.

FIG. 12 is an example of a user interface that may be implemented for use by a consumer for the purchase of gift cards.

FIG. 16 is an example of a user interface that may be implemented to display various loyalty programs in which a consumer is participating and itemized details of a select loyalty program.

DETAILED DESCRIPTION

In the following description of preferred embodiments, reference is made to the accompanying drawings that form a part hereof, and which show, by way of illustration, specific embodiments in which the invention may be practiced. Other embodiments may be utilized and structural changes may be made without departing from the scope of the present invention.

I. Targeted Marketing and Consumer Resource Management

Figure 1:
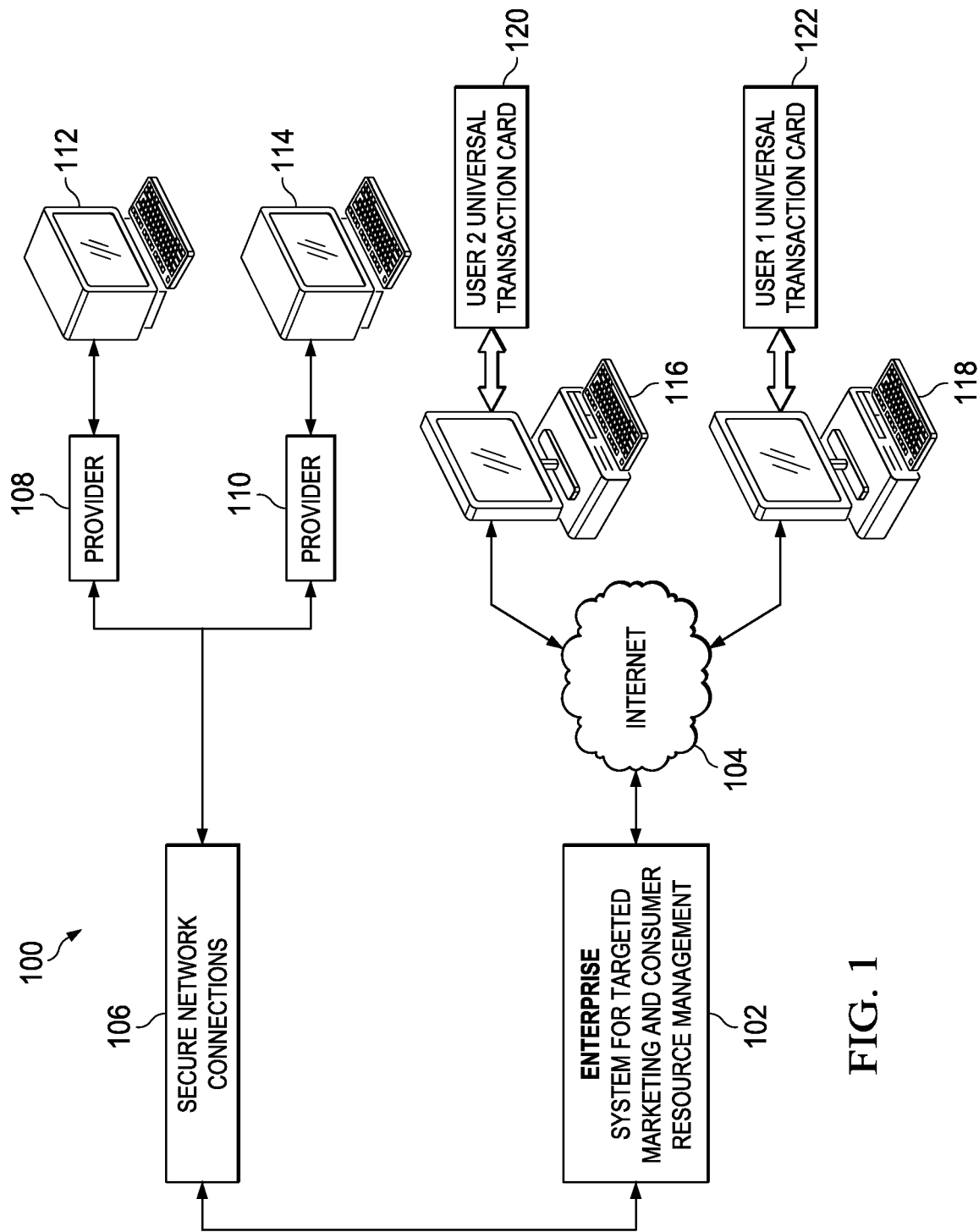
FIG. 1 is a schematic diagram of an example system for providing consumer resource management and targeted marketing.

FIG. 1 is a schematic diagram of an example system 100 for providing consumer resource management and targeted marketing. The system 100 includes an enterprise infrastructure 102 operable to communicate over the Internet 104 and over secure network connections 106, which may include connections over the Internet 104 or over any suitable wide-area network (WAN) (e.g. telecommunications networks). The enterprise infrastructure 102 may be operated by an enterprise offering targeted marketing to goods and services providers 108, 110, and consumer resource management services to consumers at network terminal 116, 118. The secured network connections 106 allow providers 108, 110 to securely connect to the enterprise infrastructure 102. The secured network connections 106 are secure in that the connections are private (for example, point-to-point, or virtual private network connections), restricted access connections. The providers 108, 110, retailers in particular, may use Point-of-Sale (POS) terminals 112, 114, which may connect to the enterprise infrastructure 102 over the secured network connections 106. The Internet 104 provides access to the enterprise infrastructure 102 to consumers using network terminals 116, 118. The network terminals 116, 118 may include personal computers, laptops, handheld devices, mobile phones, or any other computing device capable of running World-Wide Web client applications (e.g. web browsers).

The example system 100 shown in FIG. 1 depicts POS terminals 112, 114 as the retailers' source of interaction with the enterprise infrastructure 102. Other types of terminals may be used instead, such as network terminals (similar to network terminals 116, 118), which may include PCs, laptops, handheld devices, mobile phones, or other devices. Network terminals may, for example, be made available in Kiosks to provide retailers access to the enterprise infrastructure 102.

The providers 108, 110 in the system 100 in FIG. 1 may include retailers, service providers, and manufacturers that may or may not have a commercial presence on the Internet 104. The retailers, service providers and manufacturers that have a commercial presence on the Internet 104 may provide product distribution channels to allow consumers to purchase goods on-line and consumer services that ease and enhance the consumer's on-line shopping experience. The product distribution channels may include a web-site that allows credit card transactions, secured bank account access, and account information to individual consumers that have accounts with the providers 108, 110. The providers 108, 110 may also include banks through which consumers may access funds.

In the system 100 in FIG. 1, the providers 108, 110 may be in a business relationship (e.g. contractual) with the enterprise operating the enterprise infrastructure 102 that permits configuration of electronic commercial access to the partners via the enterprise infrastructure 102. The providers 108, 110 may be retailers that collect data from the POS terminals 112, 114 relating to purchases made by consumers at the retailer's stores. The providers 108, 110 may be manufacturers that may use the enterprise infrastructure 102 as a product distribution channel, or as a source of information for targeted marketing. Providers 108, 110 having a business relationship and using services with the enterprise infrastructure 102 are also referred to as "partners" in this description.

The enterprise infrastructure 102 may work with consumers as members, subscribers, or customers having an account with the enterprise infrastructure 102. Consumers may access, configure and use tools available on a consumer front-end interface to their accounts. The consumers may purchase gift cards or configure a universal transaction identifier 120, 122 to represent those gift cards having a balance for making purchases associated with it. The universal transaction identifier 120, 122 may be similar to a gift card. However, while gift cards are made for purchases from specific retailers, service providers or manufacturers; the universal transaction identifier 120, 122 may be configured to permit a consumer to purchase goods from different providers 108, 110. The POS terminals 112, 114 may be equipped with a universal transaction identifier 120, 122 reading device to associate the universal transaction identifier 120, 122 with a consumer account in the enterprise infrastructure 102. The consumer account may include data relating to the partners 108, 110 from which goods may be purchased and balances or limits on the gift card amounts that may be used for purchasing goods from each partner 108, 110.

It is noted that the universal transaction identifier 120, 122 includes identifying information that is keyed to the consumer's account in the enterprise infrastructure 102. The identifying information is recorded on the magnetic strip of the universal transaction identifier (card) 120, 122 similar to a credit card. The identifying information may however be stored on something other than a card such as, a radio frequency identifying transmitter (RFID), a barcode, or any other suitable form. The identifying information may also be a thumbprint image that may be compared with a consumer's thumbprint image that may be scanned at the POS terminal 112, 114 or any other biometric identifier. In addition, access to the system may also be accomplished using an identification proxy such as a user's telephone number or some other means of unique identification.

For purposes of this application, a universal transaction identifier may be also be referred to as universal transaction card, neither of which require the use of a physical card to function as an identifier. Both a universal transaction identifier and universal transaction card shall mean any mechanism for identifying a consumer and associating such identification with a consumer's account in the enterprise infrastructure 102. Further, when referencing the purchase or use of a universal transaction identifier or universal transaction card, it is not required that the purchase of any physical structure be made to function as a universal transaction identifier and universal transaction card.

The consumers may interact with the enterprise infrastructure 102 using a client application that connects to consumers' accounts with tools for assisting the consumer in managing consumer resources. The client application provides the consumer front-end to the enterprise infrastructure 102. At the consumer front-end, the consumer may perform functions such as: purchase gift cards, swap gift cards, track balances, subscribe to and manage loyalty programs, track offers and coupons from partners, store and sort receipts, rebate redemption and tracking, and other functions as described in more detail below with reference to FIGS. 10-21.

The enterprise infrastructure 102 may include a system network for performing a variety of services for both providers 108, 110 and consumers. The system network includes applications that provide the tools available to consumers on the consumer front-end and database storage systems for storing information relating to consumers and their accounts and for storing information relating to providers. The system network also includes hardware and software for implementing security measures to protect consumers' data as well as system data.

In an example system for targeted marketing and consumer resource management such as the system 100 in FIG. 1, the enterprise infrastructure 102 provides consumers with a web-site having tools, features, functions and applications that allow consumers to manage their consumer resources and to purchase, or obtain, and swap gift cards 120, 122. As described in more detail below with reference to FIGS. 10-21, the tools include a personal profile section, a features section, and a personal resource management section. The personal profile section allows a consumer to store information that would assist the consumer in making shopping and purchasing decisions, and that will assist in providing the consumer with targeted offers and savings and in controlling the volume and frequency of communication from Retailers. Among other features, the features section provides a consumer with tools for purchasing gift cards and swapping the cards for purchases at other stores. The features section also provides lists of offers and savings targeted for the consumer according to various targeting mechanisms (e.g. demographics, zip code, psychographics, loyalty, etc.), which may be provided to the user. The features section also allows consumers to engage in a transaction to swap or trade gift cards with other consumers. The personal management section provides tools that allow the consumer to manage gift cards, special offers, loyalty programs, retailer credit card accounts, receipts and rebates.

The system 100 provides providers 108, 110 with focused access to consumers. Providers 108, 110, as partners with the enterprise, may target advertisement, offers, coupons and other information about their products and services to consumers who generate data used by the partners through their access via the consumer front-end. Providers 108, 110 thus obtain a more focused audience for their advertisement and information relating to the success or failure of their advertising campaigns. Providers 108, 110 also obtain more precise information regarding the ownership and use of their gift cards, including via the consumers' use of a universal transaction identifier. Provides 108, 110 may also target markets, and track consumer spending across multiple channels such as marketing (online, offline, direct marketing, etc.) and sales (B&M retailers, online retailers), both online and offline.

II Enterprise Infrastructure

Figure 2:
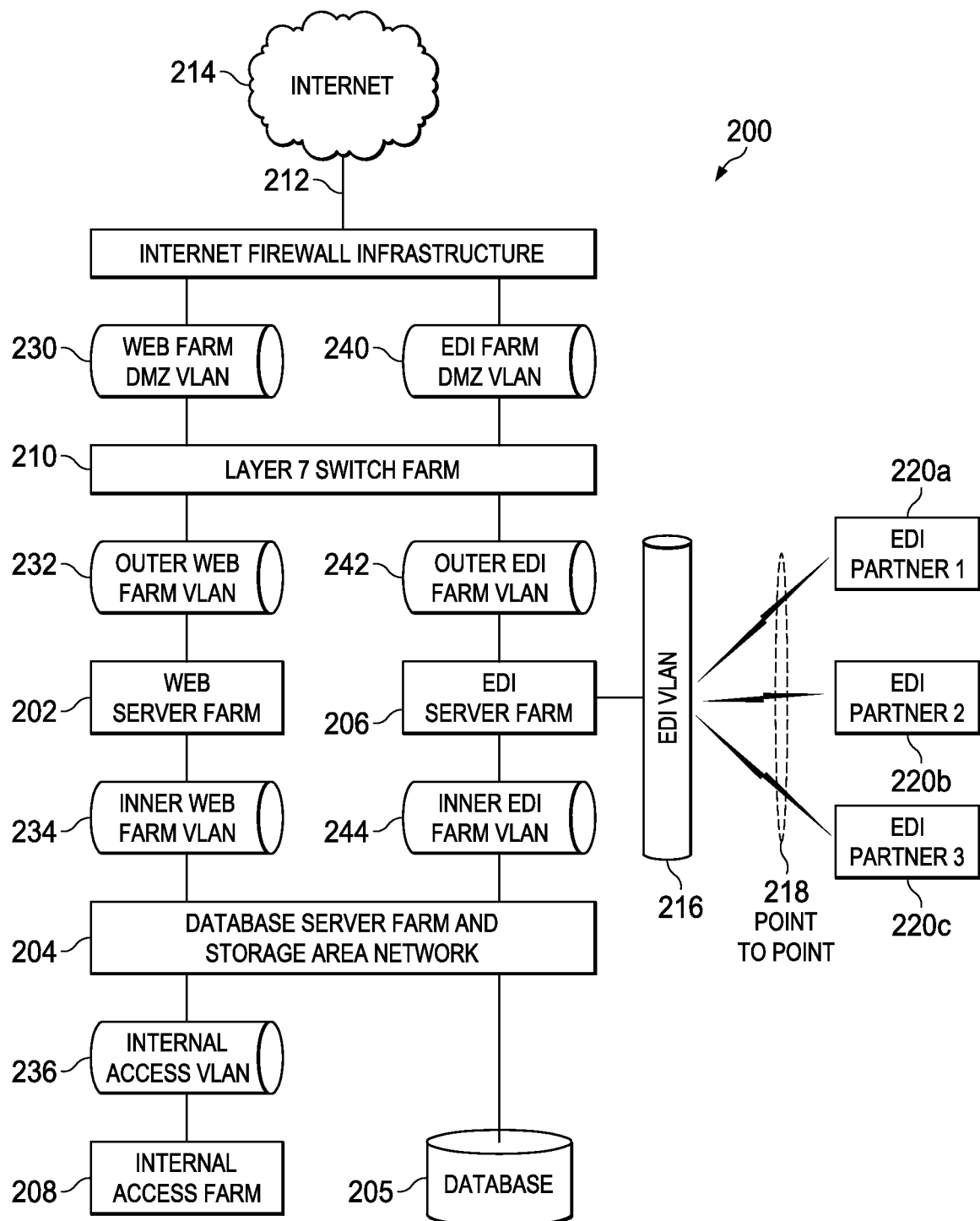
FIG. 2 is a block diagram of an example system network that may be used to implement an example of the system in FIG. 1.

FIG. 2 is a block diagram of an example system network 200 that may be used to implement an example of the system in FIG. 1. Those of ordinary skill in the art will appreciate that the system network 200 in FIG. 2 is described to illustrate one example of a network that may be used to implement the system described above with reference to FIG. 1. Many other network architectures not described here may be used as well. The system network 200 includes a web server farm 202, a database server farm 204, an electronic data interchange (EDI) farm 206, and an internal access server farm 208. The system network 200 includes a layer 7 switch farm 210 and an Internet firewall infrastructure 212 to implement a consumer front-end over the Internet 214. The consumer front-end may be implemented as a site on the World Wide Web. The system network 200 also includes an EDI virtual local area network (VLAN) 216 with point-to-point connections 218 to EDI partners 220a, 220b, 220c.

In general, the system network 200 in FIG. 2 includes remote and local infrastructure. Connectivity to the system network 200 may be provided by co-location facilities hosting the remote infrastructure. Remote infrastructure includes servers, routers, databases and other network entities that are geographically distributed as needed to provide access to partners and to consumers. The remote infrastructure includes devices that may fall under a functional class and may be distributed in the system network 200 as a farm (e.g. web server farm, EDI server farm, etc.). Local infrastructure may include servers, routers, databases and other network entities that provide limited, primarily internal access within the system for targeted marketing and consumer resource management. Local infrastructure may also be geographically distributed with access limited by network design (e.g. completely internally accessed databases may be maintained within an Intranet).

The system network 200 in FIG. 2 implements a logical separation of server systems based upon type and manner of access. This introduces multiple layers of access, and in turn, provides a deeper layer of security, even within the system network 200. The system network 200 includes a general vertical depth of separation of service and levels of security allowing for several layers of access. The layers of access range from the consumer front-end (via the Internet 214), which is at the forefront and has the lightest layer of security, to a system data base 205, which is at the deepest layer of access and security.

The layers of access are implemented as virtual local area networks (VLANs) having no real access to one another except through routing done by routing modules on the network switches. Each VLAN may be configured appropriately to limit access according to the appropriate level of security. The levels of security correspond in general to four tiers of network entities: the presentation tier, the business logic tier, the data access tier, and the data tier.

At the top level of access (for the consumer front-end), the presentation tier is responsible for delivery of data to end clients outside of the enterprise infrastructure. The end clients may be consumers or partners 220a, 220b, 220c. In the presentation tier, data is formatted for communication with the business logic tier of applications that processes requests and handles data delivery to the client applications. Data in the presentation tier may be in XML format along with XSLT stylesheets to allow rendering by client applications. The presentation tier operations, generally, in a layer of servers from the web server farm 202 that resides in a DMZ (DeMilitarized Zone) network. These servers in the DMZ network may be accessed using a web farm DMZ VLAN 230 and the Layer 7 switch farm 210. The DMZ network servers operate as proxy servers between consumers and the enterprise infrastructure.

The next layer of access includes servers in the web server farm 202 that form the business logic tier. The business logic tier includes application code (Beans) that will handle requests from client applications (such as web browsers) and make requests to the Data Access Tier for relevant data. It will then process the data and deliver it for presentation to the client applications. The business logic tier is kept separate from interaction with consumers to preserve integrity of the applications and access to the database 205. Added security may be provided by an outer web farm VLAN 232.

In the next layer, the data access tier may make requests directly to the Data Tier (or the database 205). The data access tier may be separate from the business logic tier of applications to differentiate how the data is stored and how it is retrieved from certain platforms. Security may be configured with an inner web farm VLAN 234.

The data tier is in the last layer of security, which includes the database 205, and which has the tightest security to protect the most critical data. Security may be configured with an internal access VLAN 236.

The system network 200 includes a general horizontal separation of EDI partnerships, which are logical VLANs that separate access by each partner 220a, 220b, 220c to the infrastructure of the example system for targeted marketing and consumer resource management implemented using the system network 200. In general, a partner may access their own private VLAN at 216 and 218 into the system network 200 infrastructure through a VPN concentrator or routed through a routing module on the backbone switch. This structure may isolate potential security breaches from single partners 220a, 220b, 220c. It may also prevent any partner 220a, 220b, 220c from being able to access rival partner data from the system network 200.

The EDI partner access to the system network 200 may also be layered vertically according to level of security. An EDI farm DMZ VLAN 240 provides the lowest level of security at the consumer front-end for access to the EDI server farm 206. The outer EDI farm VLAN 242 provides a higher level of security at a business logic level similar to the business logic tier described above with reference to the web server farm 202. The highest level of security is provided at the inner EDI farm VLAN 244 for access to more critical data via the database server farm 204.

Connectivity to the system network 200 may be provided by co-location facilities hosting the remote infrastructure. Connectivity may be provided by Tier 1 Internet Backbone providers to ensure access to most networks without having to transcend networks in order to provide the shortest network path from Leverage Consumer to Leverage Infrastructure. Besides utilizing connectivity to Tier 1 providers and managing complex BGP routes to the Internet Backbone, a backup connection to InterNAP will also be established.

In the example system for targeted marketing and consumer resource management, the complex backbone connections force the infrastructure to appear "local" to the consumers accessing the system network 200 via their host ISPs. This prevents the consumer from transcending networks between peer networks and eventually experience degraded network performance.

A. Web Server Farm

The web server farm 202 includes two banks of servers for serving either static or dynamic content. Each bank may be designated as either the static web farm or the dynamic web farm. The static web farm may service client requests for static content that is neither database generated nor does it use any type of server content processing and generation before being transmitted through the Internet to the client applications (e.g. web browser). Such examples of content would be images, video, or web templates. The dynamic web farm may be designed to serve dynamic content generated in multiple ways, whether that is done via XML/XLS transformation, server-side scripting, or through middle-tier applications that directly interfaces with the database 205.

The web server farm 202 may be implemented using any suitable hardware and software systems implementing server functions. In one example implementation, the web server farm 202 is implemented with Sun multiprocessor blade servers running either the Solaris™ operating system or Red Hat Linux Enterprise™ operating system. The example implementation of the web server farm 202 also includes the Zeus™ Web Server (ZWS) application. Like the Apache™ Web Server application, the ZWS is a robust, commercial-grade, full-featured and highly efficient web server software. However, ZWS is multi-threaded to leverage the symmetric multiprocessing nature of multi-cored hardware platforms, which increases the response times and load servicing for client requests. The web server farm 202 will also house the Java™ application server software that operates the applications to service consumer requests on the enterprise website. The Java™ Application Server software may be a combination of Apache Tomcat for simple java applications and JBoss Application Server software for J2EE applications.

It is to be understood that specific implementations of the web server farm 202 may use any suitable hardware and software systems. The hardware and software systems described above are merely examples of the types of hardware and software systems that may be used.

B. Database Server Farm

The database server farm 204 may store data specific to consumer front-end interactions and the EDI partner data collected from partners 220a, 220b, 220c. The database server farm 204 may be implemented using any suitable hardware and software systems configured to operate as database servers. In one example implementation, the database server farm 204 is implemented using Sun multiprocessor Enterprise servers banked with multi-core processors and full redundant power and mirrored drives for the operating system and database application. Depending upon the nature of the application and the database 205 that is needed to interface against such applications, the database server farm 204 may run either the Oracle Database Server product or the MySQL Database server product. Also, depending upon the nature of the data that is being stored, highly complex relational database tables may use Oracle while simplistic database schemas may use MySQL. The database server applications may be clustered to ensure high availability and fault tolerance. This will also provide application load balancing among the database server farm 204.

The database 205 for the database server farm 204 may reside in a SAN (Storage Area Network) solution that will offer both high availability and fault tolerance.

It is to be understood that specific implementations of the database server farm 204 may use any suitable hardware and software systems. The hardware and software systems described above are merely examples of the types of hardware and software systems that may be used.

C. EDI Farm

The EDI (Electronic Data Interchange) farm 206 may be designated in the system network 200 to communicate with partners 220a, 220b, 220c. The EDI farm servers 206 may have different applications and permissions from the web server farm 202 to access and process, as well as store, data within the database farm 204. The nature of the applications operating on the EDI farm servers 206 may have more direct access to the database 205 to increase efficiency in data processing and storage. The EDI farm servers 206 may reside in a private VLANs (Virtual Local Area Networks) that can only be accessed via VPN (Virtual Private Network) Concentrators or through specific Point-to-Point access into the VLAN as shown at 216 and 218.

The EDI farm servers 206 may be implemented using any suitable hardware and software system configured to operate server functions. In an example implementation, the EDI server farm 206 is implemented using the same platform as that of the web server farm 202 or by running IBM Mainframes. The EDI farm servers 206 software in the example implementation may also be similar to that of the web server farm 202 software. If the EDI farm servers 206 include IBM Mainframes, then the hardware will run IBM AIX operating systems, and the EDI farm servers 206 will run IBM Websphere Application Server software.

It is to be understood that specific implementations of the EDI server farm 206 may use any suitable hardware and software systems. The hardware and software systems described above are merely examples of the types of hardware and software systems that may be used.

D. Internal Access

The internal access farm servers 208 may also resemble the web server farm 202 in platform, software, and resource architecture. However, like the EDI farm servers 206, the applications will be tailored for internal access from an enterprise Intranet. Such applications may include data mining and statistical information for marketing and sales.

III. Partner Interfaces to the Enterprise Infrastructure

A. Retail Partner Infrastructure

Figure 4:
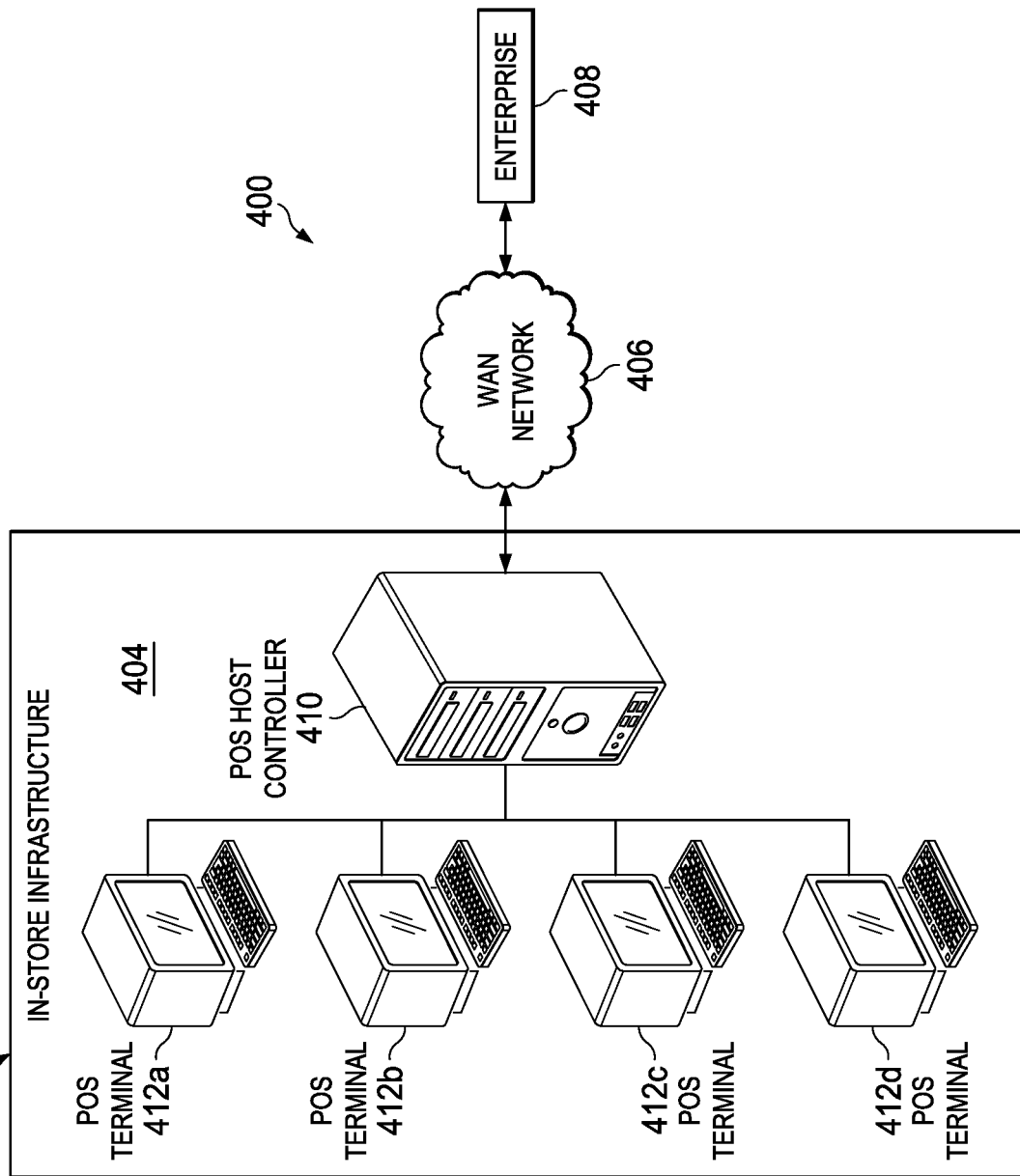
FIG. 4 is a schematic diagram depicting another example of a retail partner infrastructure.

The retail partner infrastructure provides partners with connectivity to the enterprise infrastructure 100 (in FIG. 1). The implementation of the retail partner infrastructure for any given retail partner may depend on the computer network system connecting the retail partner's point-of-sale terminals in the partner's stores. Some partners may operate with large, functionally rich computer networks, and others may have smaller, more basic computer systems. FIGS. 3-5 depict three general configurations of retail partner infrastructures.

FIG. 3 is a schematic diagram depicting one example of a retail partner infrastructure 300. The retail partner infrastructure 300 includes an in-store infrastructure 302, a first WAN interface 304, a retail network operations center (NOC) 306, a second WAN interface 308, and an enterprise infrastructure 310. The in-store infrastructure 302 includes a POS host controller 312 connected to the first WAN interface 304 and to POS terminals 314a-d. At each retail partner location 320, transactions processed at each POS terminal 314a-d may be communicated to the host controller 312. In FIG. 3, each retail partner location 320 is networked to a central or semi-central infrastructure that consolidates data and manages both internetworking and intranetworking traffic but also EDI partner traffic. The central infrastructure in the retail partner infrastructure 300 is the NOC 306. The host controller 312 may collect the data associated with each transaction from each POS terminal 314a-d and communicate the data to the NOC 306.

Consumers may purchase goods at the retail partner location 320 using gift cards via swiping their universal transaction identifier 120 (in FIG. 1) at one of the POS terminals 314a-d. The POS terminal 314a-d may be equipped with a card reader, such as a credit card reader, for sensing the information on the universal transaction identifier. In a transaction, the consumer may offer the universal transaction identifier to the salesperson at the retail partner location 320. The universal transaction identifier may be read by the card reader at the POS terminal 314a-d to determine the appropriate customer account. The identifier is communicated, along with the purchase price of the article being purchased and any other relevant data (e.g. an identifier for the article being purchased), to the host controller 312, which communicates the universal transaction identifier and purchase price to the enterprise infrastructure 310.

At the enterprise infrastructure 310, an appropriate application for the retail partner processes the transaction by looking up an account associated with the universal transaction identifier. The account is checked to determine if the balance associated with any gift cards relating to the retail partner is sufficient to cover the transaction. If the balance is sufficient, and the consumer chooses to use the balance, the transaction is processed and recorded. The balance associated with the retail partner gift card represented by the universal transaction identifier is reduced accordingly. Other functions may be performed during the transaction before it is finalized at the POS terminal 314a-d, including transmitting data regarding offers and savings relating to the transaction and the use or accrual of rewards associated with a loyalty program The retail partner infrastructure 300 leverages the existing network infrastructure setup between each retail location 320 to the corporate office's NOC 306. Data may be channeled through the NOC 306 to establish a network path providing a central point of contact into the enterprise infrastructure 308. In the retail partner infrastructure 300 in FIG. 3, the partnership may be managed at a single point to ease integration and management.

FIG. 4 is a schematic diagram depicting another example of a retail partner infrastructure 400. In the retail partner infrastructure 400, each retail location 402 operates independently using an in-store network 404 having a POS host controller 410 connected to a plurality of POS terminals 412a-d and a WAN network 406, which provides connectivity to an enterprise infrastructure 408. Data consolidation and accounting may be performed in the same host controller 410.

FIG. 5 is a schematic diagram depicting another example of a retail partner infrastructure 500. The retail partner infrastructure 500 in FIG. 5 includes an in-store network 504 in each store 502. The in-store network 504 includes a plurality of POS terminals 504 connected to a WAN network 506, which provides connectivity to an enterprise infrastructure 508. The retail partner infrastructure 500 may establish an EDI relationship either at each POS Terminal 512a-d or through an in-store POS Host Controller (not shown). This may include building interfaces into either the POS Terminal 512 or POS Host Controller or both. Connectivity may be established either by a point-to-point line or via the Internet using a VPN gateway setup either to Host Controllers or to Retail Partner NOC (Network Operation Center) infrastructure.

IV. Pos Terminal Interfaces

Figure 8:
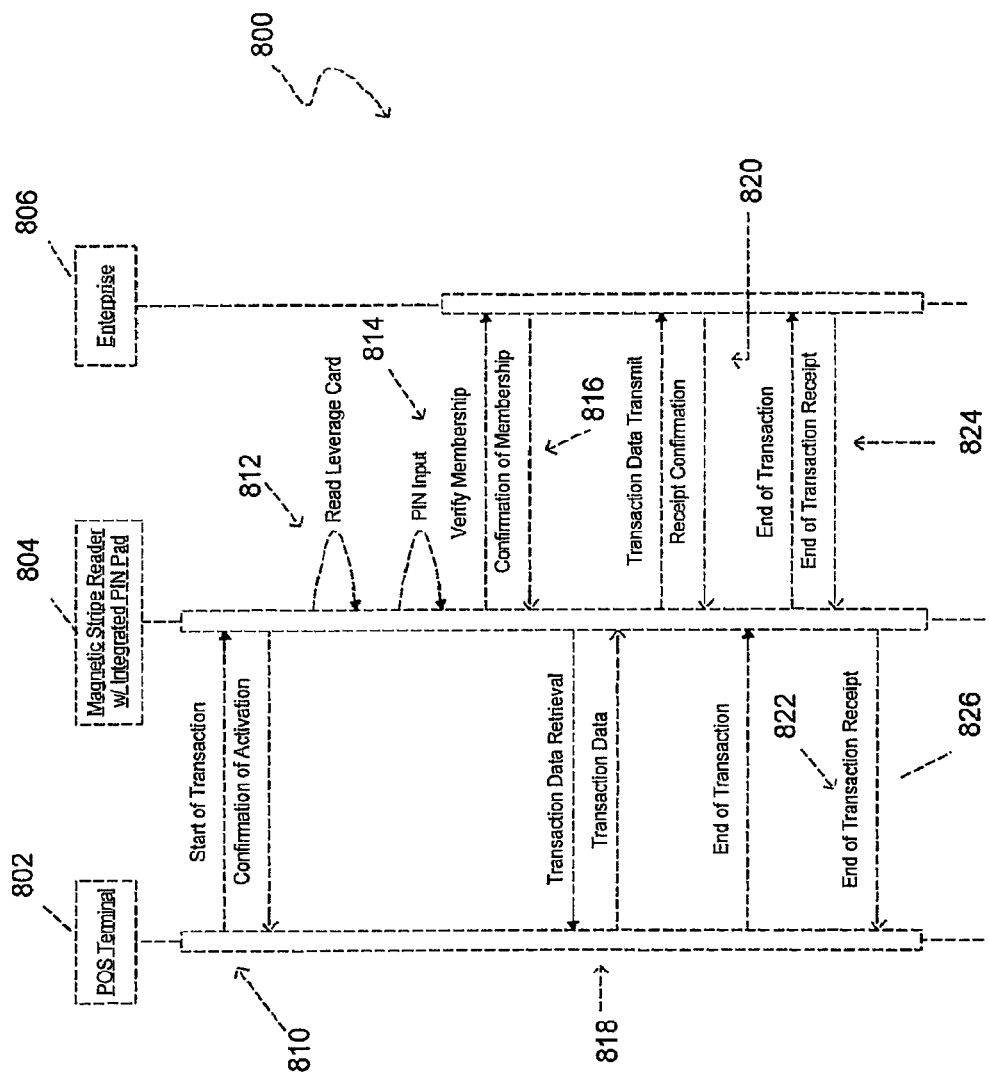
FIG. 8 is a flow diagram depicting operation of another example of a POS terminal interface.

As described above with reference to FIG. 3, a consumer using a universal transaction identifier may make purchases that may be processed at the POS terminals 314a-d. FIGS. 6-8 depict operation of examples of POS terminal interfaces to the enterprise infrastructure illustrating how data on consumer purchasing behavior may be collected and made available to partners. POS terminal interfaces that may be implemented include, but are not limited to:

Scanner Interface
Magnetic Stripe Reader (MSR) Interface
PIN Pad Interface
POS Application Interface Of the 4 most common enterprise infrastructure interfaces, three are interfaces to a hardware device. The remaining enterprise infrastructure application interfaces against the enterprise infrastructure at the application or higher level.

FIG. 6 is a flow diagram depicting operation of an example of a POS terminal 602 that includes a barcode scanner 604 for UPC or SKU barcodes on goods being purchased for communication to an enterprise infrastructure 606. The POS terminal 602 includes a computer terminal having a typical human interface for processing commercial transactions. While the barcode scanner 604 is shown as a separate component in FIG. 6, the barcode scanner 604 or other universal transaction identifier reader may be viewed as an integral part of the POS terminals shown in FIGS. 1-5.

Referring to FIG. 6, a salesperson in a retail partner location (store) may initiate a transaction at the POS terminal 602. The POS terminal 602 may, in response, send a message indicating a start of the transaction to the barcode scanner 604 at 608. The barcode scanner 604 receives the message and performs initialization steps and indicates a readiness to scan a barcode by sending a receipt message to the POS terminal 602 at 608. The POS terminal 602 also sends a message indicating start of a transaction to the enterprise infrastructure 606 at 610. The message at 610 may be sent over a retail partner infrastructure such as the example retail partner infrastructures described above with reference to FIGS. 3-5. The enterprise infrastructure 606 may respond with start of transaction receipt at message 610. At 612, the sales person may, using the barcode scanner 604, scan the UPC or SKU causing the UPC or SKU data to be communicated back to the POS terminal 602 at 614. The POS terminal 602 may send the UPC or SKU data to the enterprise infrastructure 606 at 616 and wait for a scanned item UPC receipt. When the receipt is received, the POS terminal 606 may send a message at 618 to the barcode scanner 604 indicating the end of the transaction and wait for a receipt. The barcode scanner 602 may then send a message indicating the end of the transaction to the enterprise infrastructure 606 and wait for a receipt at 620.

FIG. 7 is a flow diagram depicting operation of another example of a first POS terminal. The example in FIG. 7 uses a barcode scanner 704 as well. A salesperson in a retail partner location (store) may initiate a transaction at the POS terminal 702. The POS terminal 702 may, in response, send a message indicating a start of the transaction to the barcode scanner 704 at 708. The barcode scanner 704 receives the message and performs initialization steps and indicates a readiness to scan a barcode by sending a receipt message to the POS terminal 702 at 708. The POS terminal 702 also sends a message indicating start of a transaction to the enterprise infrastructure 706 at 710. The message at 710 may be sent over a retail partner infrastructure such as the example retail partner infrastructures described above with reference to FIGS. 3-5. The enterprise infrastructure 706 may respond with start of transaction receipt at message 710. At 712, the sales person may, using the barcode scanner 704, scan the UPC or SKU causing the UPC or SKU data to be communicated to the enterprise infrastructure 706 at 714. After receiving a transaction receipt, the POS terminal 702 may send a message at 716 to the barcode scanner 704 indicating the end of the transaction and wait for a receipt. The barcode scanner 702 may then send a message indicating the end of the transaction to the enterprise infrastructure 706 and wait for a receipt at 718. The barcode scanner 704 may then send a message indicating end of the transaction to the POS terminal 702 at 720.

The flow diagrams 600 and 700 in FIGS. 6 & 7 illustrate how the enterprise infrastructure 606, 706 may collect information about products purchased by consumers. The interface that implements the flow diagrams 600, 700 may interact with the barcode scanner devices 604, 704 at retail stores. These scanners may be, generally, hand-held scanners or bed scanners. Examples of such scanners include combination scanners and scales at grocery stores or hand scanners at department stores.

The enterprise infrastructures 606, 706 may distribute an application that runs on each POS terminal 602, 702 and "attach" to the scanner devices 604, 704. The enterprise infrastructure 606, 706 may then "listen" on each item scan and collect the UPC bar code or SKU information for each item. By capturing this information, the enterprise infrastructure 606, 706 may record each item purchased by the consumers.

FIG. 8 is a flow diagram depicting operation of another example of a POS terminal 802 that incorporates a magnetic strip reader with integrated PIN pad 804. The Magnetic Stripe Reader (MSR) 804 may interact with the MSR devices generally found either attached to pin pad devices for ATM authentication or built into the POS terminal 802. The enterprise infrastructure 806 may distribute an application to run on each POS terminal 802 or pin pad device that will "attach" to the MSR device 804. The enterprise infrastructure 806 may collect data from each swipe of a magnetic card, such as the universal transaction identifier in order to authenticate membership of a purchasing consumer. This will also enable identification of the consumer subscriber to the enterprise infrastructure 806 for the particular in-store purchase transaction.

The PIN pad interface of the magnetic strip reader 804 in FIG. 8 interacts with the PIN pad devices that are used to authenticate electronic payment transactions (EPT) at the POS terminal 802. Typically, the PIN pad devices include a display with keys and may or may not be integrated with the magnetic strip reader 804. The enterprise infrastructure 806 may distribute an application to run on either the POS terminal 802 or the pin pad device on the magnetic stripe reader 804. A consumer member, or customer, of the enterprise infrastructure 806 may be assigned a PIN that may be used with the universal transaction identifier. The application allows the enterprise infrastructure 806 to authenticate the consumer against its database and authorize the consumer the exclusive use of the universal transaction identifier and benefits stored within.

Referring to FIG. 8, a salesperson may begin a transaction at the POS terminal 802, which signals a start of transaction message to the magnetic strip reader 804 at 810. The magnetic strip reader 804 initializes and sends back a confirmation message at 810, then waits for the magnetic strip input. At 812, the universal transaction identifier (card) is passed through the magnetic stripe reader 804. The magnetic strip reader 804 display requests input of a PIN at the PIN pad. At 814, the consumer enters her assigned PIN. At 816, the magnetic stripe reader 804 sends the PIN and other identifying information to the enterprise infrastructure 806 for verification of membership and waits for a confirmation. When the confirmation of membership is received by the magnetic stripe reader 804, the magnetic stripe reader 804 may request transaction data from the POS terminal 802 (which may include the UPC data retrieved with the barcode scanner as described above with reference to FIGS. 6 and 7). At 818, the transaction data is requested and received at the magnetic stripe reader 804. At 820, the magnetic stripe reader 804 sends the transaction data to the enterprise infrastructure 806. The magnetic stripe reader 804 may receive a message signaling the end of the transaction from the POS terminal 802 at 822. The magnetic stripe reader 804 transmits the end of transaction message to the enterprise infrastructure 806 at 824 and waits for an end of transaction receipt message. At 826, the magnetic stripe reader 806 communicates the end of transaction receipt message to the POS terminal 802 to complete the transaction.

FIGS. 6-8 describe operation of interfaces that provide the enterprise infrastructure with access to transaction data when consumers use the universal transaction identifier. The transaction data collected during transactions includes:
product information determined using the UPC or SKU at the barcode scanner;
personal information determined using the identifier information accessed via the universal transaction identifier.

The enterprise infrastructure may store the transaction data as part of the consumer's account information. The enterprise infrastructure may also offer retail partners research and information derived from the product information and from the personal information about the consumer. The retail partners may use the information to target advertisements, offers, savings, coupons, etc. to consumers that actually purchase their products, or are more likely to purchase their products.

Transaction data may also be collected and communicated by a POS application that may run on POS terminals or within the POS host controller 312 (in FIG. 3). The enterprise infrastructure may distribute the POS application, which may establish a custom EDI connector between the retail POS application and the enterprise infrastructure in order to capture a transaction log of any particular transaction. The POS application may also track or collect other POS specific data that is relevant to the retail POS application.

V. Retail Partner Application Architecture

Figure 9:
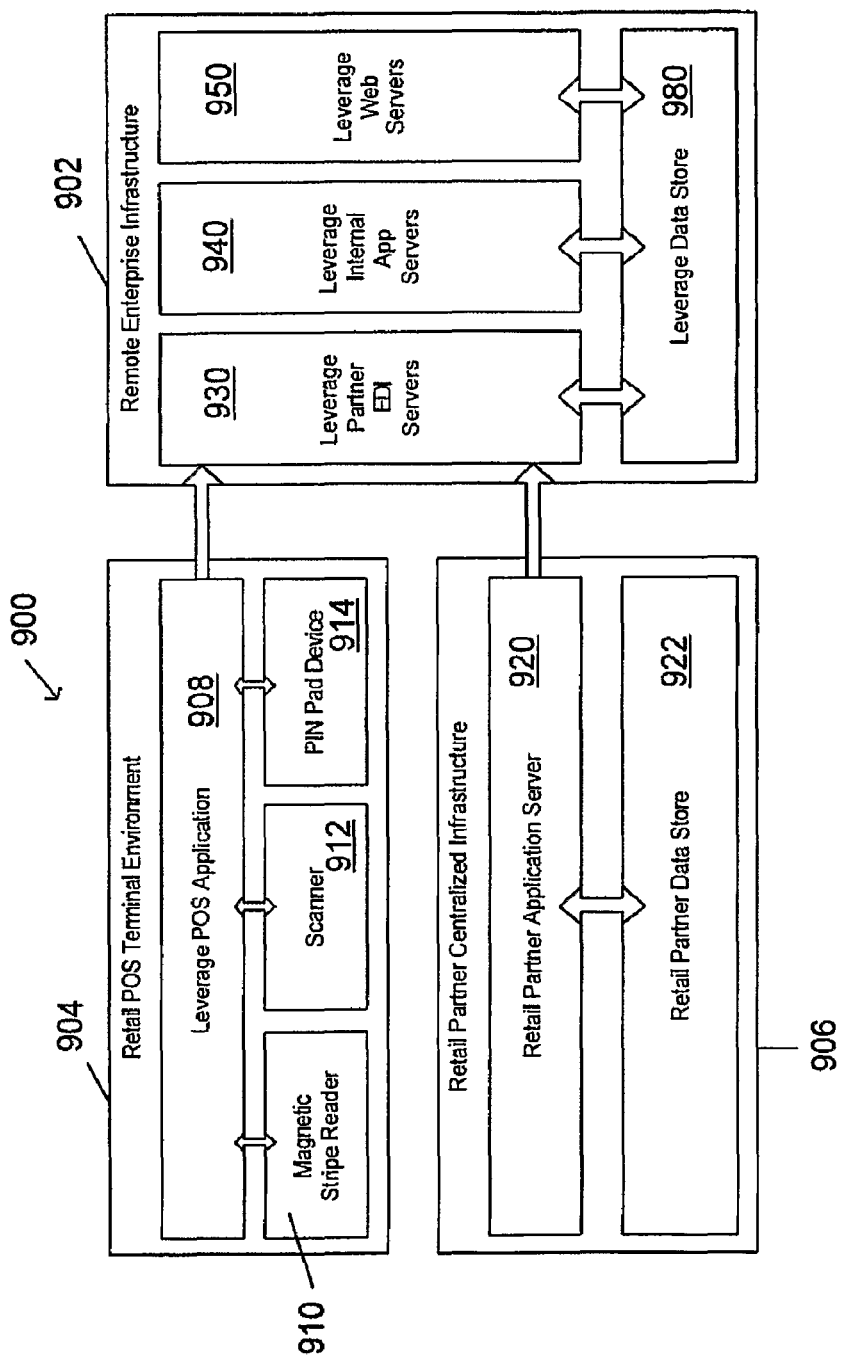
FIG. 9 is a block diagram of an example of an enterprise infrastructure interface with retail partners.

FIG. 9 is a block diagram of an example of an enterprise infrastructure and retail partner's interface 900 depicting interaction between the retail partners and the enterprise infrastructure. The enterprise infrastructure and retail partners' interface 900 includes a remote enterprise infrastructure 902, a retail PUS terminal environment 904, and a retail partner centralized infrastructure 906.

The retail POS terminal environment 904 includes components that may operate in POS terminals: a PUS application 908, a magnetic stripe reader (MSR) 910, a scanner 912, and a PIN pad device 914. The retail POS environment 902 may implement interfaces to the enterprise infrastructure 902 described above with reference to FIGS. 6-8. The POS application 908 may reside within each retail partner POS terminal 904 and interface with the MSR 910, scanner 912, and PIN pad devices 914. Upon each transaction, the transaction data collected by the POS application 908 may be transmitted in real-time to the enterprise infrastructure 902.

The data collected may be in multiple formats, depending upon the nature of the devices interfaced. The enterprise infrastructure 902 may support binary formats as well as default ASCII formats inherent to the devices. In one example, the data collected may be translated into XML for ease of transport and parsing.

The enterprise infrastructure 902 includes partner EDI servers 930, internal application servers 940, web servers 950, and a data store 980. The partner EDI servers 930 are the servers in the EDI server farm 206 described above with reference to FIG. 2. The internal application servers 940 are the servers in the internal app server farm 208 described above with reference to FIG. 2. The web servers 950 are the servers in the web server farm 202 described above with reference to FIG. 2. The data store 980 is the database 205 in FIG. 2.

As shown in FIG. 9, the enterprise infrastructure 902 communicates with the retail POS terminal environment 904 and with the retail partner centralized infrastructure 906. The retail partner centralized infrastructure 906 includes a retail partner application server 920 and a retail partner data store 922. The retail partner centralized infrastructure 906 may include the host controller 312 (in FIG. 3) connected via the retail NOC 306. The retail partner centralized infrastructure 906 may also be the host controller 412 or 512 (in FIGS. 4 and 5 respectively) in each retail store. The retail partner centralized infrastructure 906 may be an established EDI connector that interfaces between the retail partner application server 920 and the EDI servers 930.

The data collected may be in multiple formats, depending upon the nature of the devices interfaced. The enterprise infrastructure 902 may support binary formats as well as default ASCII formats inherent to the devices. In one example, the data collected may be translated into XML for ease of transport and parsing; specifically the NRF IXRetail POSLog format.

VI. Consumer Front-End

FIGS. 10-20 illustrate various examples of user interfaces that may be implemented for the system 100 to interact with the consumer and examples of the operation of the system 100 as it may interface with the consumer. While the system 100 may be implemented in various forms for interaction with the consumer, the examples illustrated in FIGS. 10-20 show an on-line web-based program designed to interact with the consumer, distribute targeted marketing campaigns and manage consumer resources. Those skilled in the art will recognize that the system may be a software system that may be designed as one or more software modules. When the system is comprised of multiple modules, the modules may reside locally or may be remotely located from one another and in communication over a network, such as the Internet.

FIG. 10 is an example of a user interface that may be implemented for use by a consumer and that provides targeted offers to particular consumers. As illustrated in FIG. 10, the consumer interface 1000 may include three main sections: (i) a personal profile section 1002; (ii) a features section 1004; and (iii) a personal management section 1006.

When a consumer desires to join as a system member, the consumer will be prompted to enter basic personal information into the system, which can later be displayed and modified by accessing the personal profile section 1002 of the consumer's personal account. In particular, the consumer will be asked to provide basic profile information, including, but not limited to, demographic information, such as age, gender, zip code preference information regarding consumer likes and dislikes and information about friends and family for whom the consumer may purchase gifts or items. As illustrated in FIG. 10, the personal profile section 1002, may be segregated into subsections of information, which may include, for example, a message center, a profile section, a friends and family section, a dates to remember section, and an event and travel calendar section (not shown). Those skilled in the art will recognize that other types of information may be gathered from a consumer to assist with targeted marketing and management of consumer purchases, including but not limited to, consumer financial information and purchasing method information, such as credit card and shipping information. Such information may be presented in any numbers of ways and should not be limited to the information or presentation of information as illustrated in FIG. 10.

In the illustrated example, the consumer, via the features section 1004 of the consumer interface may view offers and savings, may purchase gift cards, may exchange gift cards, may exchange store credit, may initiate and track rebate redemptions, among other things. Further, in the illustrated example, the consumer, via the personal management section 1006, may view his/her personal gift cards and special offers marked as being of particular interest. Additionally, through a consumer's personal management section 1006, the consumer may view his/her participating loyalty programs and rewards earned, his/her available store credits and digital receipts from recent purchase from participating retailers.

As will be described further below in connections with FIGS. 10-20, the system 100 may be designed to interact with the consumer via an on-line web-based software program and may include a number of different functions and features, which may include, but not be limited to, (a) an offer and savings feature; (b) gift card purchase feature; (c) gift card registration feature; (d) a gift card exchange feature; (e) a loyalty programs enrollment and management feature; (f) an event and travel offer and savings feature; (g) a short message services offer and savings feature; (h) a digital receipts feature; and (i) an on-line rebate feature. Further, in the example provided in FIG. 10, such features may be accessible either via the features section 1004 or the personal management section 1006 of the consumer interface.

The gift cards may be combined and accessed via a single universal transaction identifier (described above with reference to FIG. 1). The user may configure the universal transaction identifier to operate as a gift card accepted by multiple retailers, service providers or manufacturers.

A. Offers and Savings Feature

As illustrated in FIG. 10, a consumer may receive targeted marketing campaigns in the form of offers and savings or other information as part of the consumer's participation as a system 100 member. In the illustrated example, such offers and savings appear as expandable line-items listed in the features section 1004 of the consumer interface 1000 under the "View Offers & Savings" tab. Each offer may identify the vendor, provide a description of the offer, an expiration date and identify the targeting method utilized to prompt the consumer to receive each offer. The system may be designed such that the content of the offer may include one or more of the following types of content: text, video, pictures, service provider, retailer or manufacturer branding, weblinks, voice, or other data types. Furthermore, the consumer may be provided with the option of selecting offers of interest and saving those offers into the consumer personal management section 1006 of the consumer interface, which activates an offer to be available for use by the consumer.

Figure 11A:
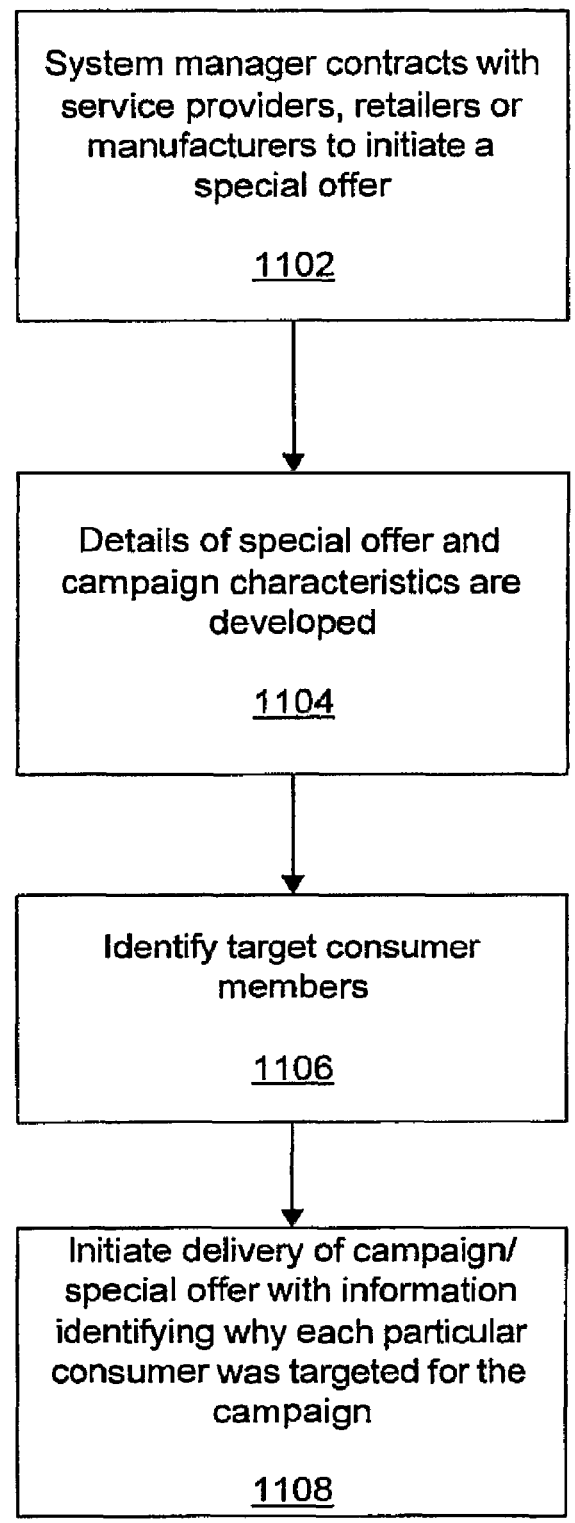
FIG. 11A is an example of a flow diagram illustrating the delivery of special offers and savings to target consumer for access and use by the consumer.

FIG. 11A is an example of a flow diagram illustrating the delivery of special offers and savings to target consumer for access and use by the consumer. As illustrated in FIG. 1, in order to receive special offers and savings for consumer system members, the system 100 manager contracts with service provides, retailers and/or manufacturers for the development of special offers to be distributed to target consumers, as illustrated in step 1102. Once the offer details are established and the characteristics of the campaign are identified, at step 1104, the system will, based upon the offer details and campaign characteristics, identify the consumer member to be targeted with the special offer, at step 1106. Finally, at step 1108 the system manager will send the special offer to the targeted consumers, which will be accessible by the consumers via their personal consumer system account. In this example, data will be sent with each special offer identifying why each particular consumer receiving an offer was targeted for the campaign.

Campaigns may be characterized by, for example, expiration dates, co-branding/short message service campaigns, offers searchable by non-target consumers, offers transferable among consumer members, on-line vs. off-line redemption, to name a few. To identify which consumer should be targeted for a particular offer or part of a campaign, targeting methods may include demographic, geographic, profile preferences/psychographics, recent purchases/uses, gift card/ store credit ownership, loyalty program memberships, event calendar, travel calendar, word of mouth/previous campaign participation. Those skilled in the art will recognize that other targeting methods may be utilized and the targeting methods are not limited to those recited above and other campaign characterization categories may be utilized, along with the offer details, to help identify the target consumers.

Figure 11B:
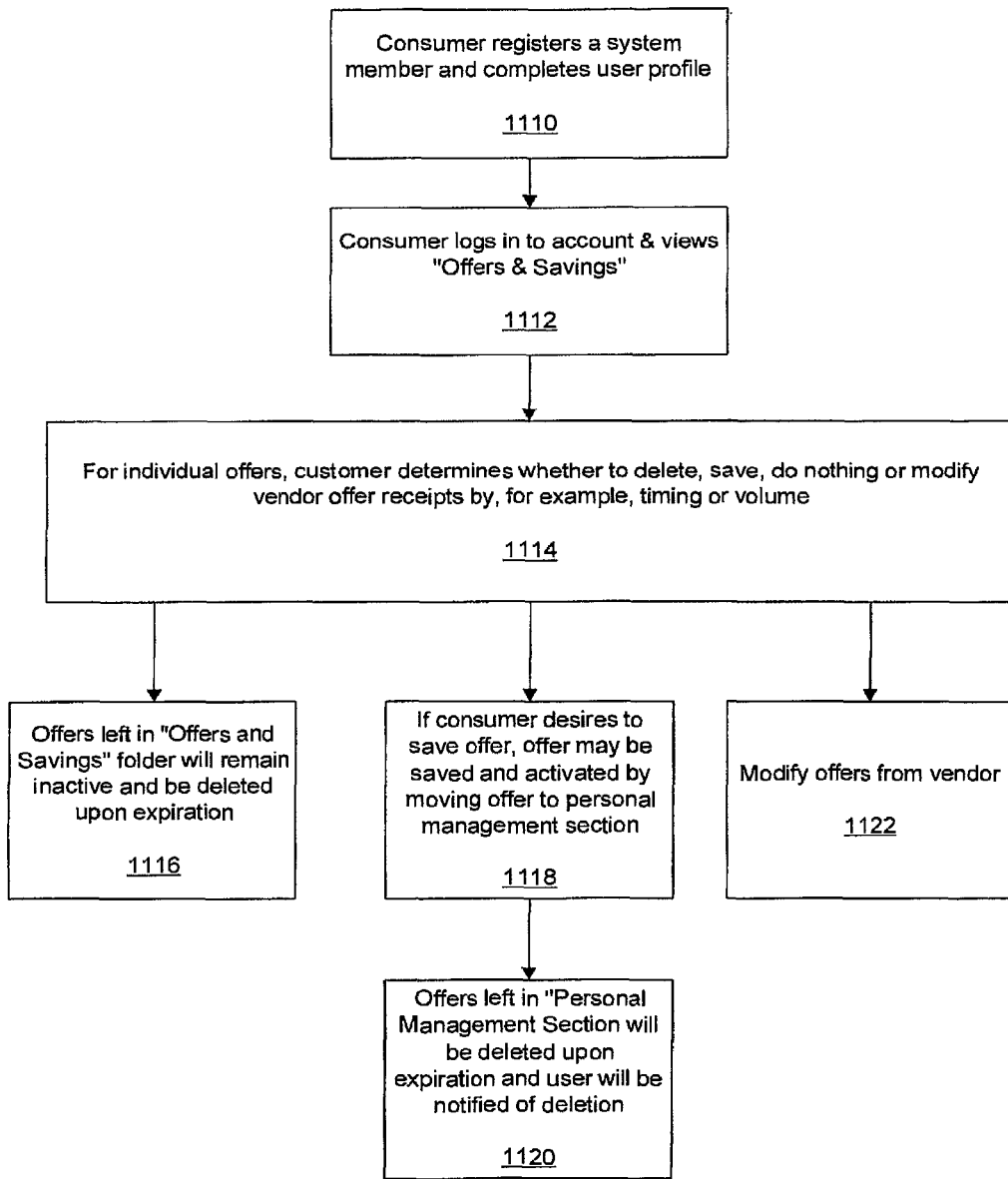
FIG. 11B is an example of a flow diagram illustrating a consumer receipt and processing of special offers and saving.

FIG. 11B is an example of a flow diagram illustrating the consumer receipt and processing of special offers and saving. To be eligible to receive special offers and savings, a consumer must first become a registered system user. To receive targeted offers, the consumer must also complete a user profile. To view a consumer's offers and savings, a consumer would, after becoming a registered user, at step 1106, log onto the consumer's account and select the "View Offers and Savings" option in the features section 1004 of the example illustrated in FIG. 10. Upon selection of this tab, the consumer will be able to view the offers that were targeted specifically to him or her and also view the reasons for receipt of a particular offer. As illustrated in FIG. 10, accompanying each offer is identifying information that allows the consumer to determine why he or she received a particular offer.

For example, as illustrated in FIG. 10, in connection with each line-item offer, the consumer is provided with information that identifies why the consumer was selected to receive this offer. In this example, this identifying information is provided in the form of colored boxes containing different indicia. Each box represents a different targeting method that was used identify the consumer as a target recipient for the particular campaign offer. Users may be provided with a key to assist in identifying the different targeting methods. As previously discussed, these targeting methods, may include, but are not limited to, demographic, geographic, profile preferences/psychographics, recent purchases/uses, gift card/store credit ownership, loyalty program memberships, event calendar, travel calendar, word of mouth/previous campaign participation. As illustrated in FIG. 10, the user interface may also allow users to roll over the boxes representing the different target information. When the user rolls over the boxes, a text bubble or other signifier may appear that provides the customer with detailed information regarding why a particular target box appears. Optionally, relevant sections in a consumer's personal management section may be highlighted to the extent that it corresponds to reasons detailed in a particular target box. For example, if the reason for receiving an offer was based upon a consumer being a loyalty program member, the loyalty program membership may be highlighted in the consumer's personal management section when the he views the target reason as being a loyalty member (as illustrated in FIG. 10).

After viewing a particular offer's details or detail summary, at step 1114 of FIG. 11B, a consumer may decide whether to delete or activate a particular offer or just do nothing. Optionally, a customer may be provided with the option to provide feedback to a particular vendor regarding the offer, seek an increased or decreased volume of offers from a particular vendor or request the receipt of no offers from a particular vendor for a given time period.

A consumer may have the option of immediately deleting unwanted offers from their offer list. If, however, a consumer decides to do nothing with a particular offer, in the illustrated example, the offer will be deleted from the user's offer listing upon expiration of the offer, without notice to the consumer, step 1116.

At step 1118, if a consumer is interested in possibly using a particular offer, the consumer may activate the offer by moving the offer to the personal management section 1006 of the consumer's account. Once moved, the offer will appear in the personal management section 1006 under a tab of activated offers, which in the illustrated example is titled "My Special Offers." In the illustrated example, at step 1120, once an offer expires, it will be removed from the consumer's personal management section 1006; however, the consumer will be notified of its expiration and deletion since special interest was shown in the particular offer.

Optionally, the system 100 may also allow a consumer to modify how he or she is targeted by a particular vendor, step 1122. In this regard, the vendor may be provided with a mechanism for sending feedback directly to a particular vendor. Furthermore, the consumer may seek more or less offers from a particular vendor, may seek offers of a particular type or category, or may seek to permanently or temporarily suspend the receipt of offers from a particular vendor.

Additionally, the system may be capable of gathering analytics and statistical data about the campaign performance and may provide such information to participating service providers, retailers and manufacturers.

B. Gift Card Purchase Feature

FIG. 12 is an example of a user interface that may be implemented for use by a consumer for the purchase of gift cards. In the example illustrated in FIG. 12, a consumer is provide with an option under the tab "Purchase Gift Card" in the features section 1004 of the consumer interface 1000. Using this function, a consumer is able to select or designate a gift card recipient. The consumer is then able to select the retailer from which to purchase the gift card and designate the gift card amount. The consumer may select multiple retailers and designate different amounts for each retailer. Recipient and payment information are provided to complete the purchase. In this example, a confirmation of the purchase is then provided to the provider.

Once the gift card purchase is complete, the consumer may receive either individual retailer gift cards or one universal transaction card configured for use as a gift card for the multiple retailers designated. The consumer may also have the universal transaction card sent to anyone designated by the consumer to receive the card as a gift.

C. Gift Card Registration Feature

Also, as illustrated in the example shown in FIG. 12, a consumer is provided with an option under the tab "My Gift Cards" to register the consumer's gift cards, or to purchase a gift card utilizing the process described in FIG. 12 above. Once gift cards are registered in the system as associated with a particular consumer account, as explained further below in connection with FIGS. 13A & 13B, the gift cards will appear in the consumer system account. In this illustrated example, the gift cards appear in the personal management section 1006 of the consumer interface 1000 under the tab "My Gift Cards."

Figure 13A:
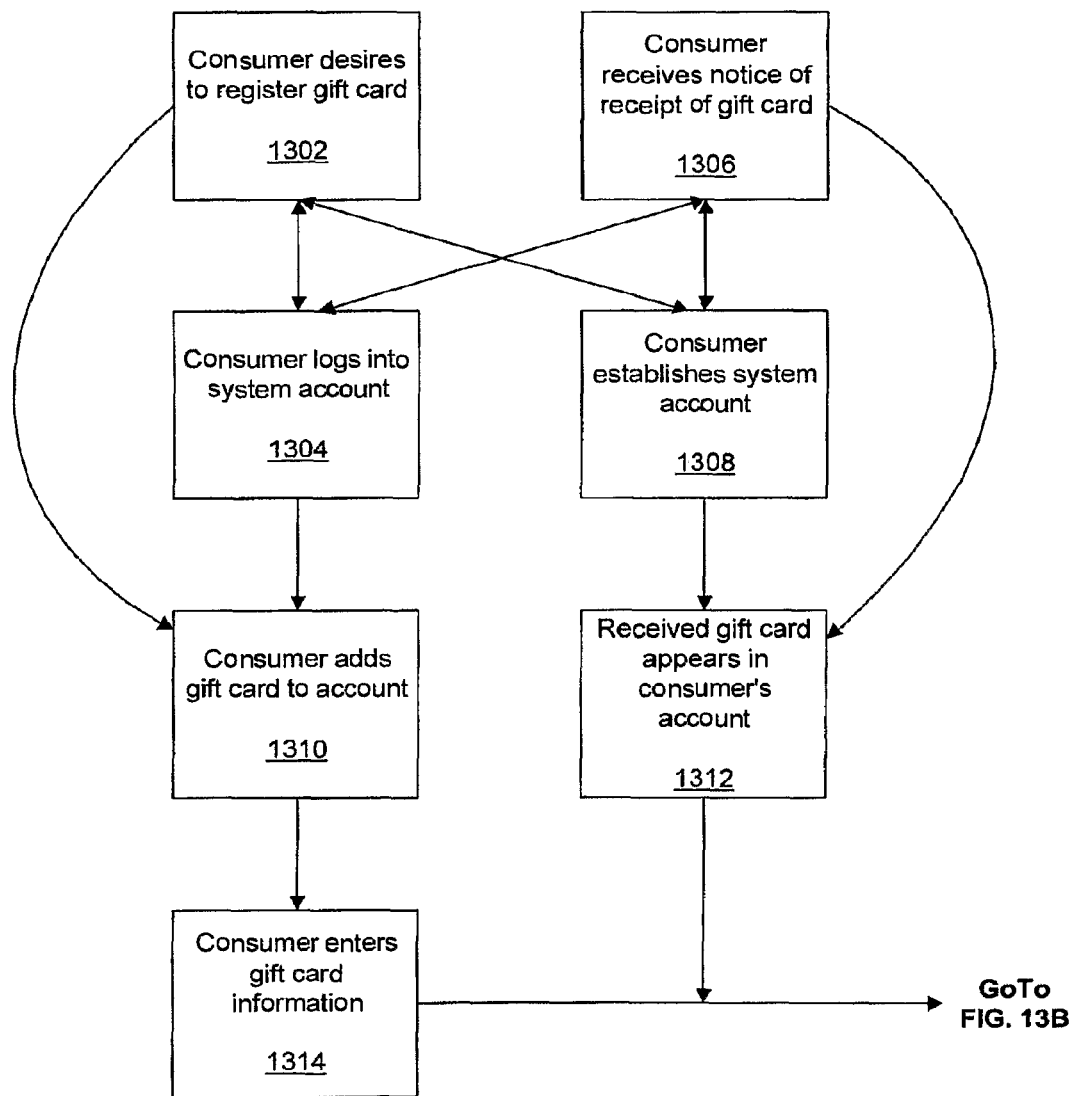
FIG. 13A is an example of flow diagram illustrating the receipt, purchase and/or registration of a gift card by a consumer.

FIG. 13A is an example of flow diagram illustrating the receipt, purchase and/or registration of a gift card by a consumer. As shown in FIG. 13A, the registration of a gift card with a consumer's account can be initiated in several ways. For example, the process can start with the consumer's desire to register a gift card 1302, in which the consumer can log onto his/her account, step 1304, to commence the registration process. Alternatively, if the consumer does not have an account, the consumer may first be required to establish a system account, step 1308.

In the illustrated example, once the account is established, a consumer may enter gift card information into the consumer's personal management section 1006. In this regard, the consumer will select an add gift card option in the consumer account. The system will then prompt the consumer to enter gift card information, such as vender information and card number, among other data, step 1314.

Additionally, someone may purchase a gift card for a consumer. If the consumer does not have an account with the system, the consumer may be notified by email, text message, mail or other notification method of the receipt of the gift card. This may then prompt the consumer to establish an account 1308, log on the system 1302, and use and or register the gift card 1302. Likewise, existing consumer account holders may receive notice of a gift card upon logging into their account by the gift card appearing in the consumer personal account, with notice to the consumer of the receipt of the gift, step 1312.

Figure 13B:
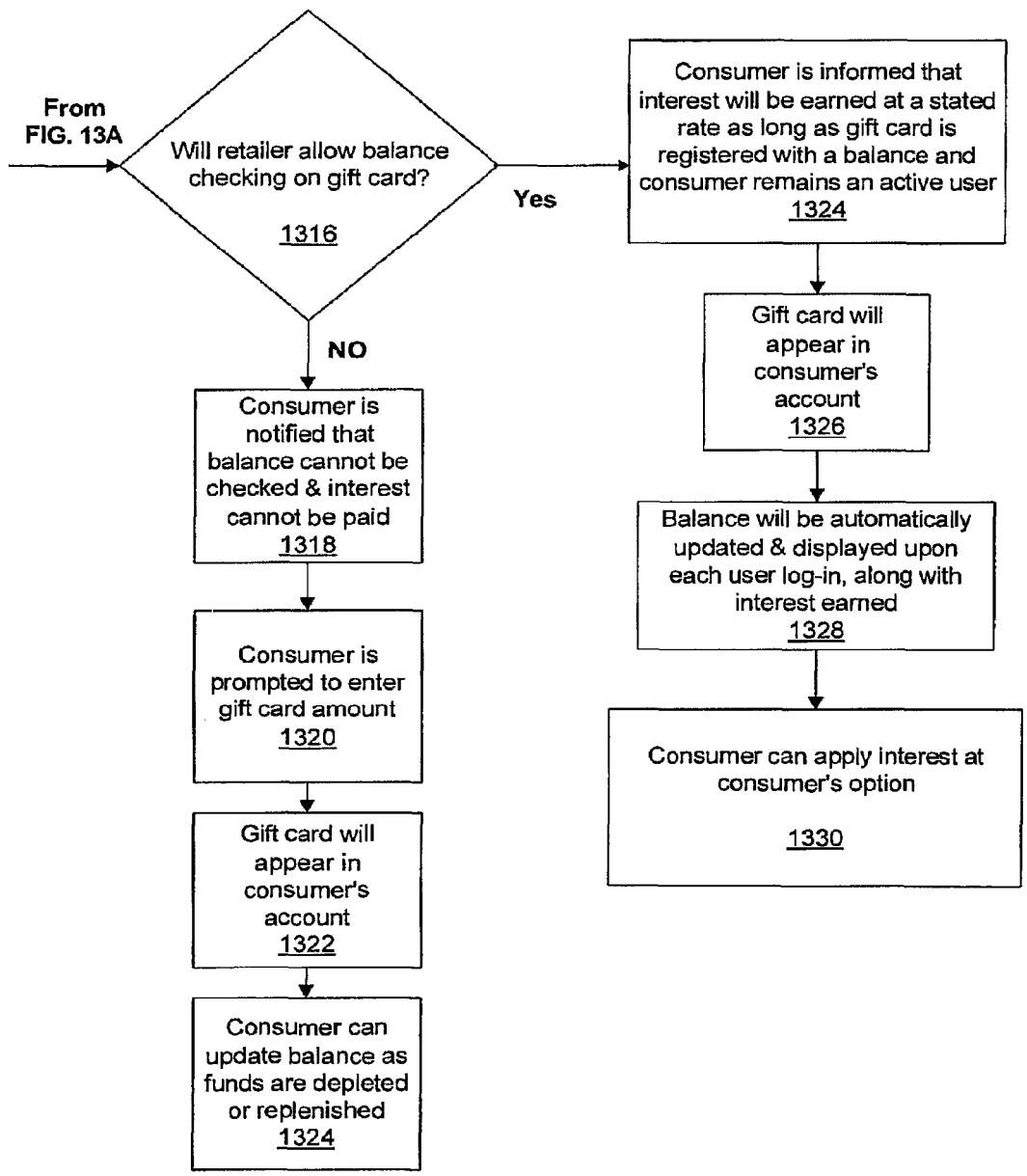
FIG. 13B is an example of a flow diagram illustrating an example of an interest bearing gift card implementation.

Whether a gift card is registered by gift or manually entered into the system 100 associated with a consumer account, in one example of an implementation, the system 100 may determine whether a particular gift card is eligible to bear interest. FIG. 13B is an example of a flow diagram illustrating an example of an interest bearing gift card implementation.

As illustrated in FIG. 13B, the system 100 will check if the vendor, i.e., service provider, retailer or manufacturer, will allow the system 100 to verify the balance on a gift card, step 1316. If the system cannot verify the balance on the gift card through the vendor, the system 100 will notify the user that the gift card is not an interest bearing card, step 1318. The consumer will then be prompted to enter the gift card amount, step 1320. The gift card will then appear in the consumer's account, step 1322 and the consumer will be required to update the balance of the funds as they are depleted or replenished, step 1324.

If, however, the system can verify the balance on a gift card, the system 100 can allow the accrual of interest for that gift card and will notify the consumer that the gift card is an interest bearing card so long as it carries a balance and the consumer remains an active system account holder, step 1324. The system will also notify the consumer of the interest rate. The gift card will then appear in the consumer's account, step 1326 and the system will automatically update the balance of the funds associated with the card upon each user login, step 1328. The balance information shall also include the accrued interest amount. Optionally, the system may allow the consumer different options on how to apply the interest. From these options, the consumer may then elect how to apply the interest, step 1330. For example, the interest may be added to the gift card, may be cashed out in the form of a check or funds transfer, may be moved to a system account for future purchases, or may be given to a designated charitable organization.

D. Gift Card Exchange Feature

Figure 14:
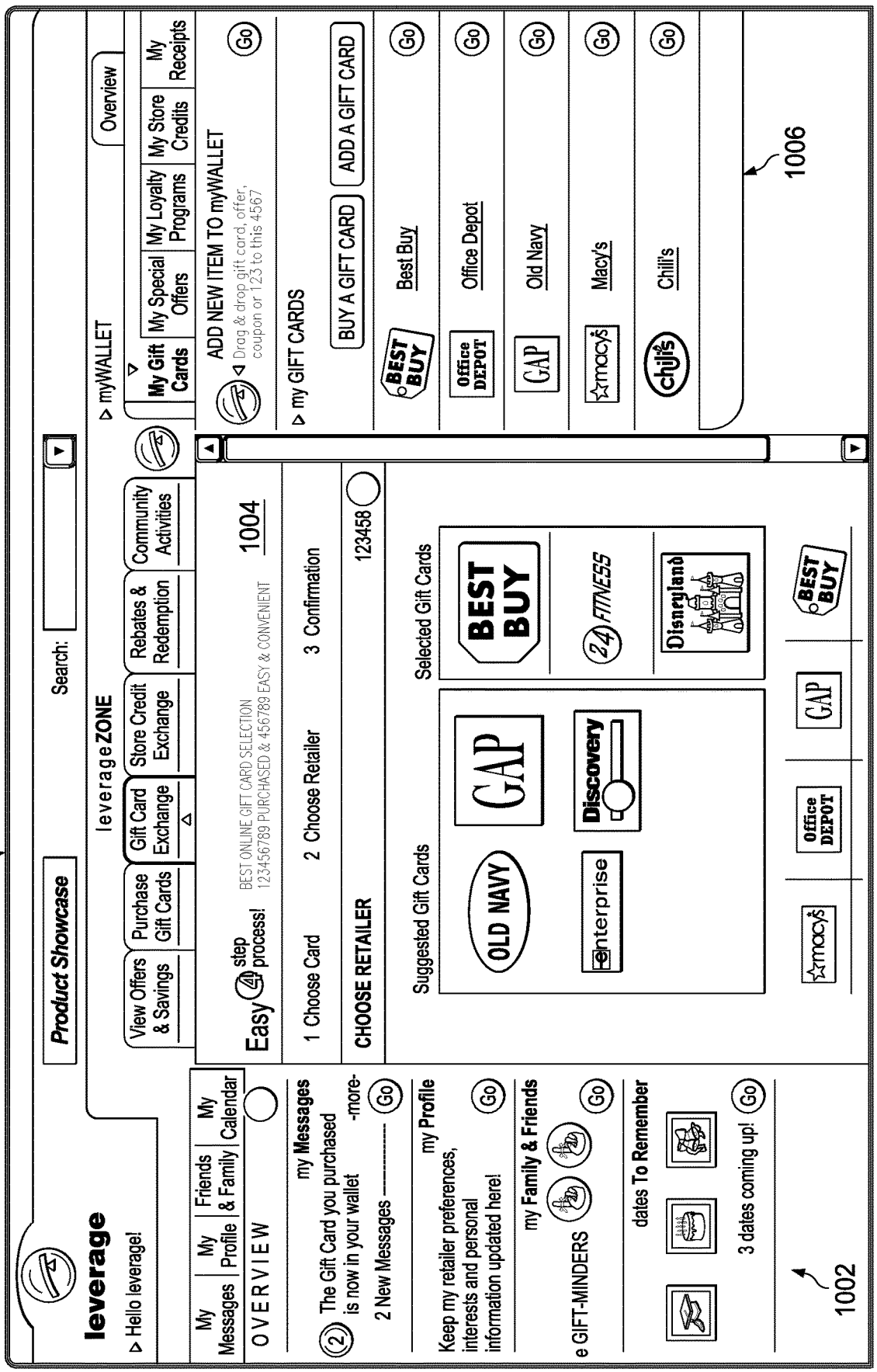
FIG. 14 is an example of a user interface that may be implemented to display a gift card exchange system and gift card balance check interface.

FIG. 14 is an example of a user interface that may be implemented to display a gift card exchange system and gift card balance check interface. As illustrated in FIG. 14, the system may include an option to allow a consumer to exchange or trade gift cards with other consumer system users. In the illustrated example, this function is available to a consumer under the "Gift Card Exchange" tab of the feature section 1004 of the customer interface 1000. FIG. 14 further illustrates, under the "My Gift Card" tab of the personal management section 1006 of the consumer interface 1000 the system's ability to display registered consumer gift cards and the account balances of each card. As explained above in connection with FIGS. 12 & 13, such information may be obtained automatically by the system from the vendor or may be manually input into the consumer's account.

Figure 15:
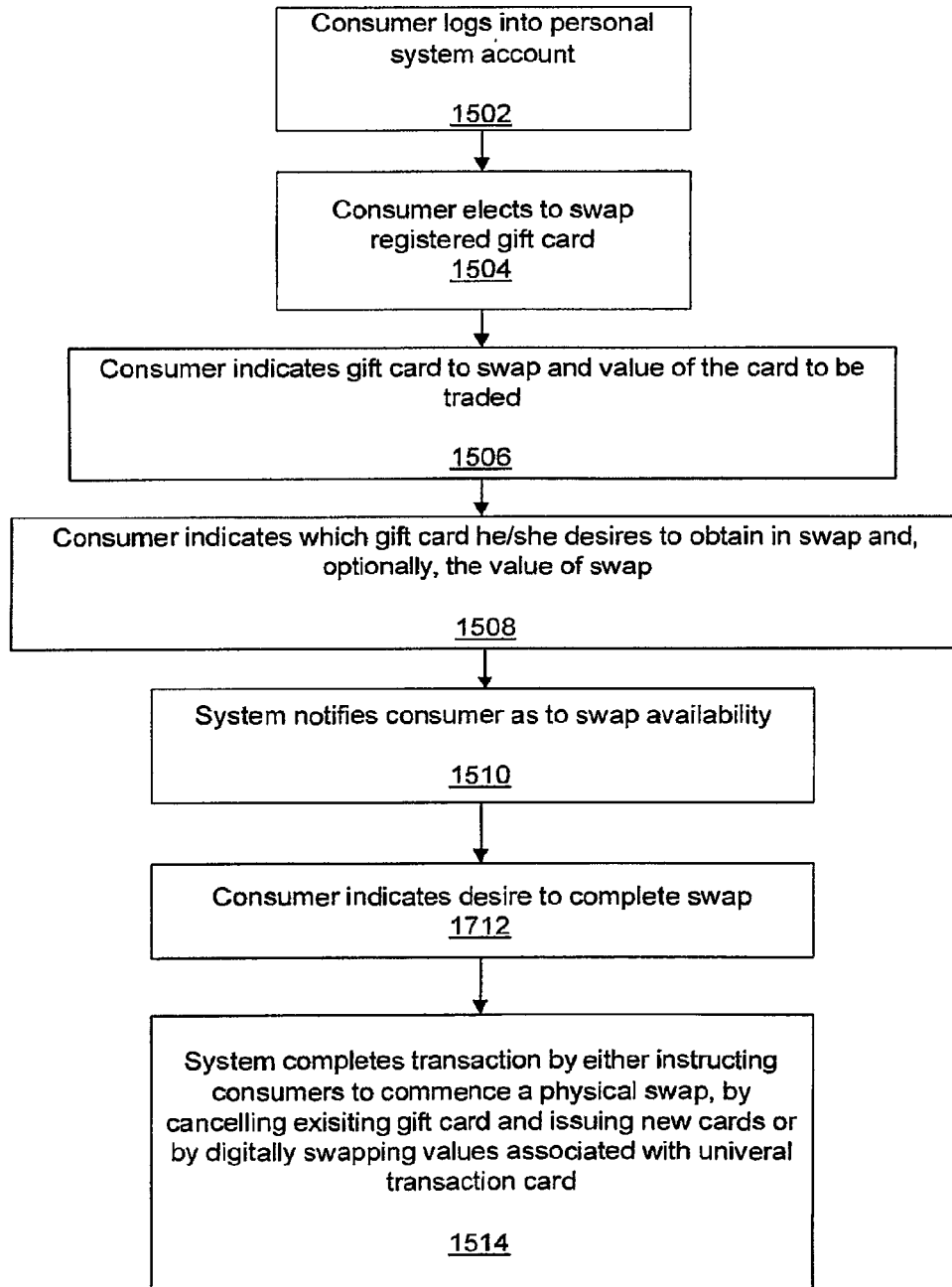
FIG. 15 is a flow diagram illustrating an example of the operation of one implementation of a gift card exchange program.

FIG. 15 is a flow diagram illustrating an example of the operation of one implementation of a gift card exchange program. As illustrated, to initiate a gift card exchange, a consumer first logs into their personal system account, step 1502. As shown in FIG. 14, this function may be made available to consumers via the feature section 1006 of the consumer interface 1000, accessible under a tab marked "Gift Card Exchange." In this example, the consumer elects to trade registered gifts cards, as described in connection with FIGS. 12 & 13 above, step 1504, by selecting the gift cards to swap and indicating the value of the card to be swapped. When cards may be digitally swapped, via for example a universal transaction card, or gift cards may be cancelled and replaced with one or more new cards, partial gift card values may be exchanged. However, when the system 100 only provides for cards to be physically exchanged between consumer, gift cards must be swapped at full card value. The system 100 can be designed to alert the consumer when such limitations exist and prevent the exchange of partial value gift cards.

Once the consumer indicates which gift card he/she desires to trade and the value of the trade, the consumer must then indicate which gift card he/she desires to acquire in the trade and the value of the trade. Step 1508. For example, the trade may be a dollar for dollar trade, or, optionally, a consumer may offer a higher or lesser value trade for another gift card, i.e., $1.50 of the consumer card for a $1.00 on the trade. When electing which gift cards the consumer desires to acquire, the system 100 may seek a first choice trade and one or more alternative trade options.

Next, the system 100 will then determine if the trade can be immediately completed and if so, with which trade choice, e.g., the first trade choice or an alternative trade, step 1510. If no trade can be immediately completed, the system 100 may then give the user the option to cancel the trade or leave it pending until the desired trade can be completed. If the trade can be immediately completed, the system 100 will present the user with his trade options. The system will then give the user the option to complete the transaction, cancel the transaction or keep the transaction pending until another trade option becomes available. For example, if the first trade option is not available, but an alternative trade option is offered. The system 100 may allow the consumer to keep the trade pending until the first option becomes available for trade.

If the consumer indicates that he desires to complete a swap, step 1512, the system will then determine how best to complete the transaction and instruct the consumer accordingly, step 1514. For example, the system may complete the transaction by either instructing consumers to commence a physical swap, by canceling existing gift cards and issuing new gift cards or by digitally swapping vendors and associated values. A physical swap may occur through the system manager or may occur directly between the trading consumers.

When a digital swap is available, the system 100 will transfer the values associated with the vendor gift cards between the trading consumer accounts. The new gift cards and values will post on the respective consumer accounts and will be accessible via a universal transaction card or vendor gift card linked to the system 100 accessible via the consumer's account.

E Loyalty Programs Management Feature

FIG. 16 is an example of a user interface that may be implemented to display various loyalty programs in which a consumer is participating and itemized details of a select loyalty program. In the illustrated example, a consumer may join or register various vendor loyalty programs. Such membership in the loyalty programs may be displayed in the consumer personal management section 1006 under the "My Loyalty Programs" tab. Upon selection, detailed information regarding a loyalty program and rewards earned by participating in such program can be displayed in the features section 1004 of the consumer interface 1000. Participation rewards and information for a particular loyalty program may be displayed by communication directly to the vendor's system to retrieve or link to the relevant data. Optionally, the system 100 may retrieve and parse the information to provide the information to the consumer in a modified format than the information format offered by the vendor.

Figure 17:
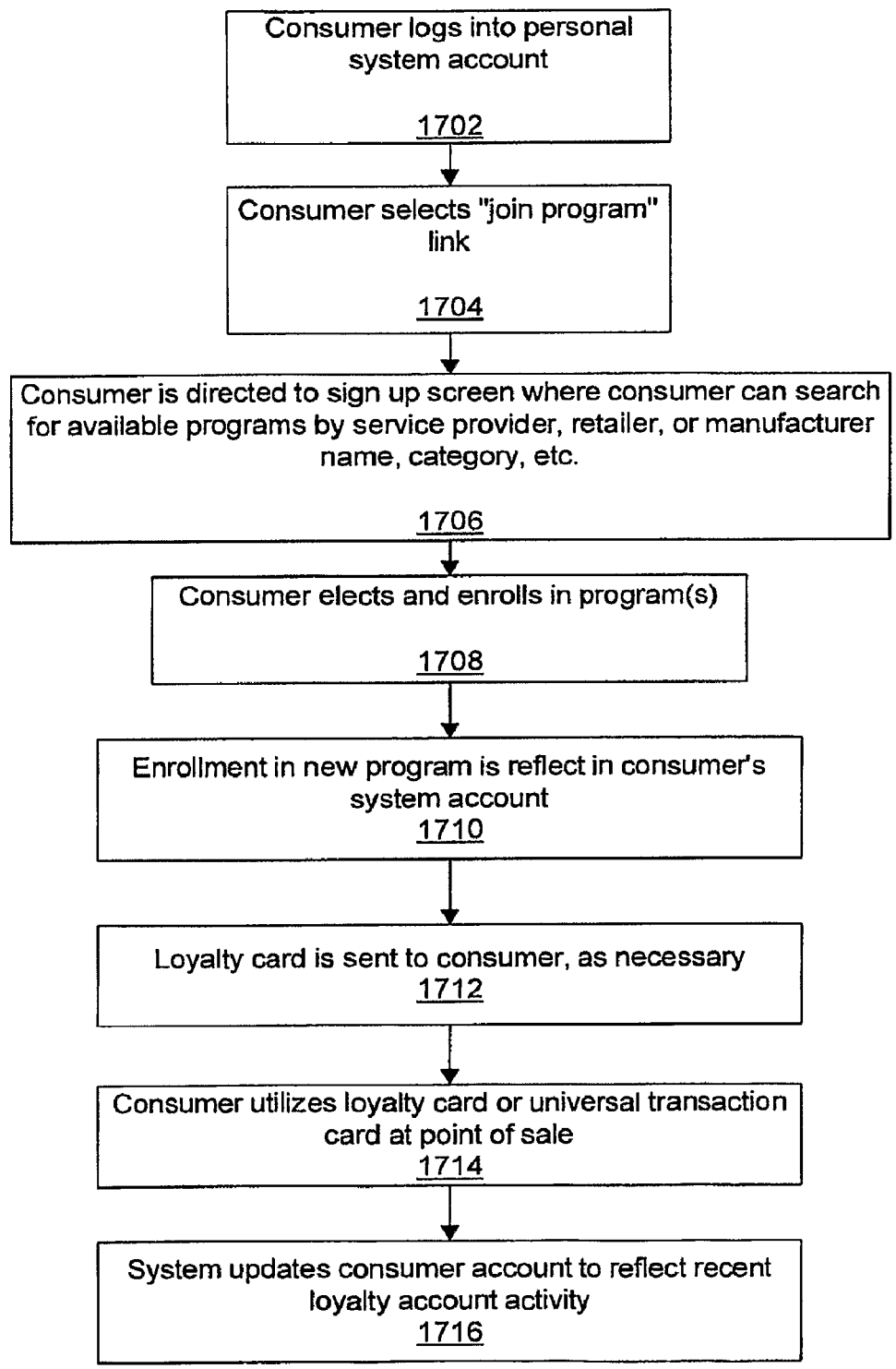
FIG. 17 is an example of a flow diagram illustrating consumer enrollment in a loyalty program and the update of information related to the loyalty program.

FIG. 17 is an example of a flow diagram illustrating consumer enrollment in a loyalty program and the update of information related to the loyalty program. While the system 100 may be designed to allow a consumer to manually enter and manually or automatically track loyalty information, as will be further described below, the system 100 may also allow a consumer to enroll in a loyalty program via the consumer interface 1000 and automatically track the loyalty program rewards for each loyalty program. Once a customer is logged onto his personal system account 1702, the consumer may elect to join a loyalty program. As illustrated in FIG. 16, an election may be made on the consumer interface 1000 that permits the consumer to join select loyalty programs. In the illustrated example, this election is available under the "My Loyalty Programs" tab in the personal management section 1006 of the consumer interface 1000. To add an additional program, the consumer would select the "join new program" option on the screen, 1704.

Once the consumer elects to join a new program, the system would then direct the user to the sign-up screen (not shown) where the consumer may search for available on-line loyalty programs by vendor name and or category, such as electronics, step 1706. The consumer would then elect which program(s) to join and complete the necessary enrollment information form to become a loyalty member, step 1708. Enrollment in the new program would then reflect in the system account, for example under the "My Loyalty Programs" tab in the personal management section 1006 of the consumer interface 1000, step 1710. The system manager may then send an associated loyalty card to the consumer, if required by the vendor, step 1712, or if the consumer has a universal transaction card for the system 100, that identified account will automatically begin to track loyalty transactions. In either case, the consumer may be required to use the loyalty card or the universal transaction card to track consumer transactions at point of sale and receive loyalty rewards and/or benefits, step 1714. Whenever a transaction is completed using a loyalty card or universal transaction card applicable to a loyalty program, the system 100 can then update the individual consumer's account to reflect recent loyalty account activity, step 1716.

Optionally, the system 100 may receive manual input of loyalty information and based upon the input of information, download associated loyalty information or provide an automatic link, for example, through a web browser, to the consumer's loyalty information on the vendors' website, as illustrated in FIG. 16.

F. Event and Travel Offer and Savings Feature

Figure 18:
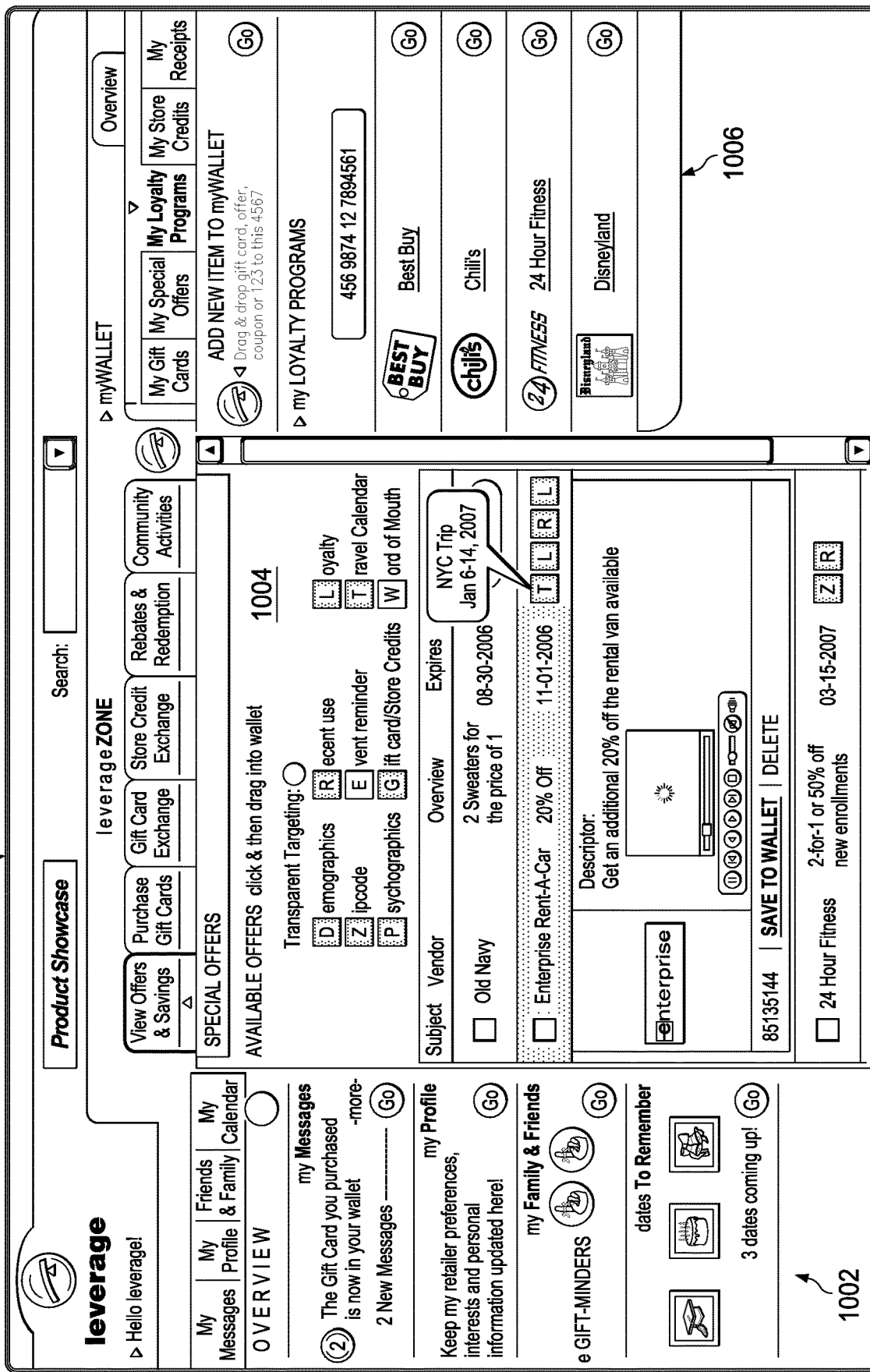
FIG. 18 is an example of a user interface that may be implemented to display a targeted offer sent to the user in response to the user completing a travel calendar.

FIG. 18 is an example of a user interface that may be implemented to display a targeted offer sent to the user in response to the user completing a travel calendar. In the illustrated example, the offer from Enterprise, displayed in the consumer's offer listing, indicates that is was send to the consumer using a travel calendar targeting method, among other methods. This is evident by the "T" in the box displayed at the end of the first line of the offer. When the user scrolls over the target box indicating the target method was the travel calendar, the consumer reveals that the offer was sent to him/her in part because he/she had indicated that they were going on a trip to New York, Jan. 8-14, 2007. Accordingly, in this example, this offer was sent in response to information that the consumer placed in his/her personal profile section 1002 regarding an upcoming trip to New York. As will be further described below, similar offers can be targeted to specific consumer based upon event information identified in a consumer personal profile, as well as travel or trip information.

Figure 19:
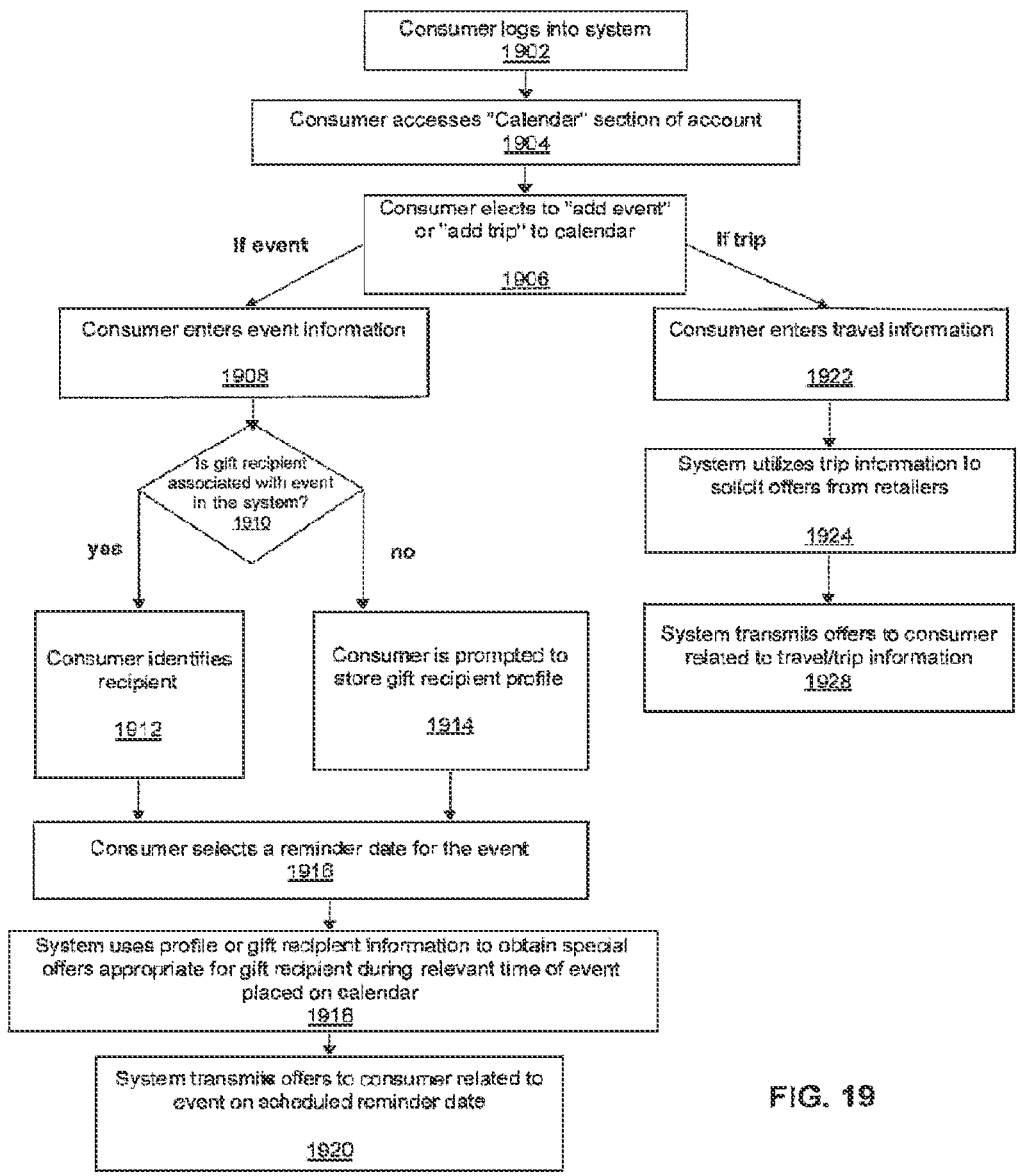
FIG. 19 is an example of a flow diagram illustrating the delivery of special offers and savings to target consumer in response to the completion of an event or travel calendar.

FIG. 19 is an example of a flow diagram illustrating the delivery of special offers and savings to target consumer in response to the completion of an event or travel calendar. For a consumer to enter event or travel information, the consumer must first be logged into the system 100, step 1902. Once logged on, the consumer is then able to access a "Calendar" section of the consumer account, which may be located in the personal profile section 1002 of the consumer interface 1000. This section may also be combined with or part of a "My Dates to Remember" section, as illustrated in the example in FIG. 18.

Under the calendar section the consumer will be provided with various options, which may include, but not be limited to, entering event and trip information. The consumer can then elect to enter either type of information into the consumer's personal profile, step 1906. If the consumer enters an event into his/her profile, for example, a wedding or an individual's birthday, step 1908, the system 100 will then prompt the consumer to associate a gift recipient with the event, 1910. If the recipient's profile is already in the system 100, the system 100 will then prompt the consumer to identify the recipient, step 1912. If the consumer is not in the system 100, the system 100 will then prompt the consumer to enter the recipient's profile information, step 1914. Optionally, the system 100 may also prompt the consumer to select a reminder date for the event, 1918.

Using the event information, user profile and gift recipient information, the system 100 can then work with vendors to obtain appropriate offers for gift recipients prior to the event placed on the calendar, step 1918. Such offers can then be transmitted to the consumer, which will then appear as part of the consumer's offers and will reference the offer receipt as associated with the particular event.

Alternatively, in the case of a trip, the consumer may enter travel information into the consumer's user profiles, such as dates of travel, travel method, destinations, mode of transportation, point of interest, etc. Similar to the event calendar, the system can then use this information to solicit offers from vendors that pertain to the trip dates, destinations and travel plans, step 1924. Such offers can then be transmitted to the consumer, which will then appear as part of the consumer's offer listing and will reference the offer receipt as associated with the particular trip, as illustrated in FIG. 18, which shows a rental car offer applicable for the dates of travel.

G. Short Message Services Offer and Savings Feature

Figure 20:
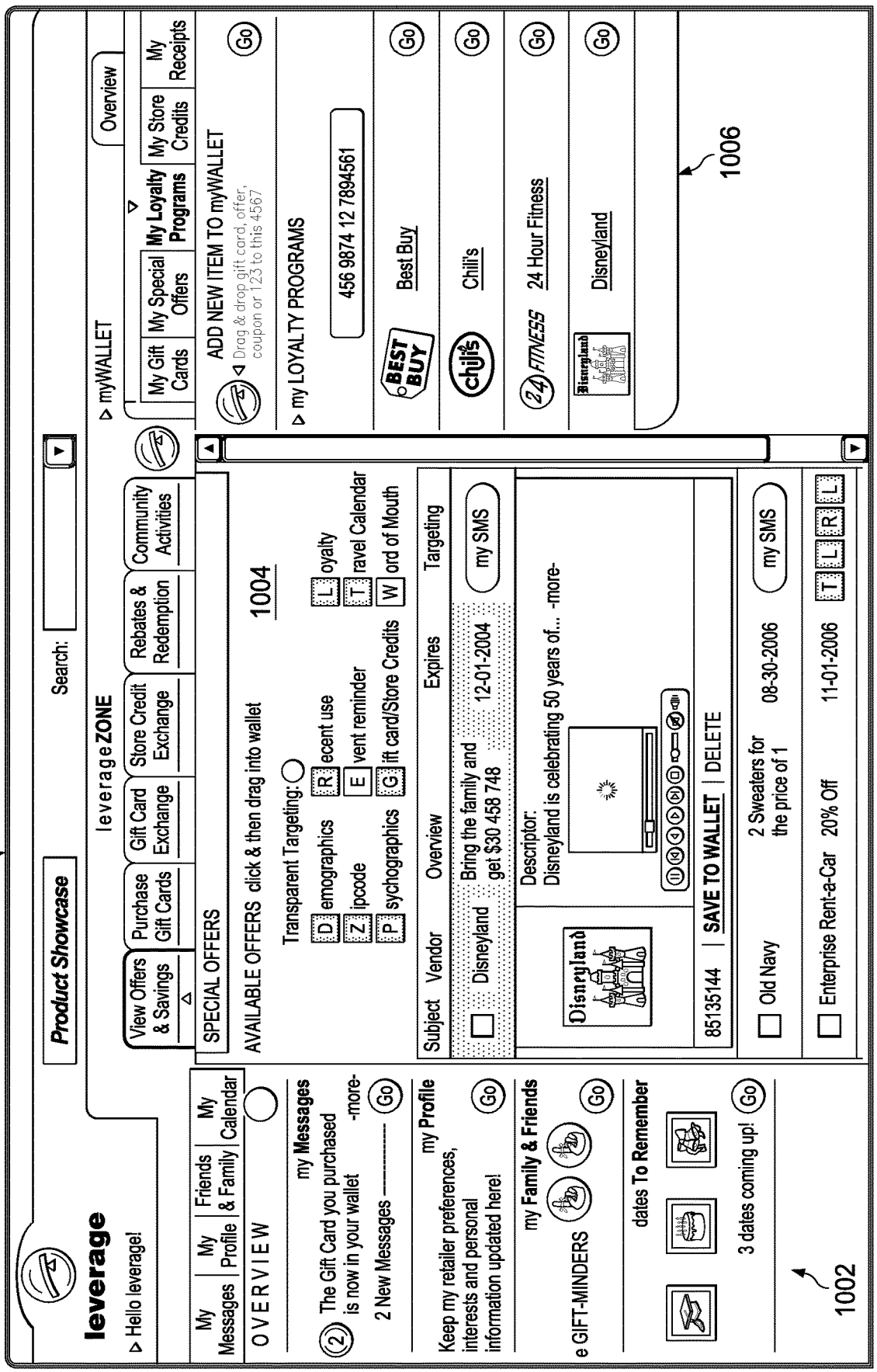
FIG. 20 is an example of a user interface that may be implemented for use by a consumer and which provides a consumer with the ability to have targeted offers send to the consumer's personal system account via a short message service text message.

FIG. 20 is an example of a user interface that may be implemented for use by a consumer and which provides a consumer with the ability to have targeted offers sent to the consumer's personal system account via a short message service text message. As illustrated in FIG. 20, two SMS type offers are listed as an item in the in the offers and savings section of the feature section 1004 of the consumer interface 1000. This offer type represents an offer that is sent to a consumer's account in response to a short message service ("SMS") message sent by the consumer requesting that the offer be sent to his or her personal system account.

Figure 21:
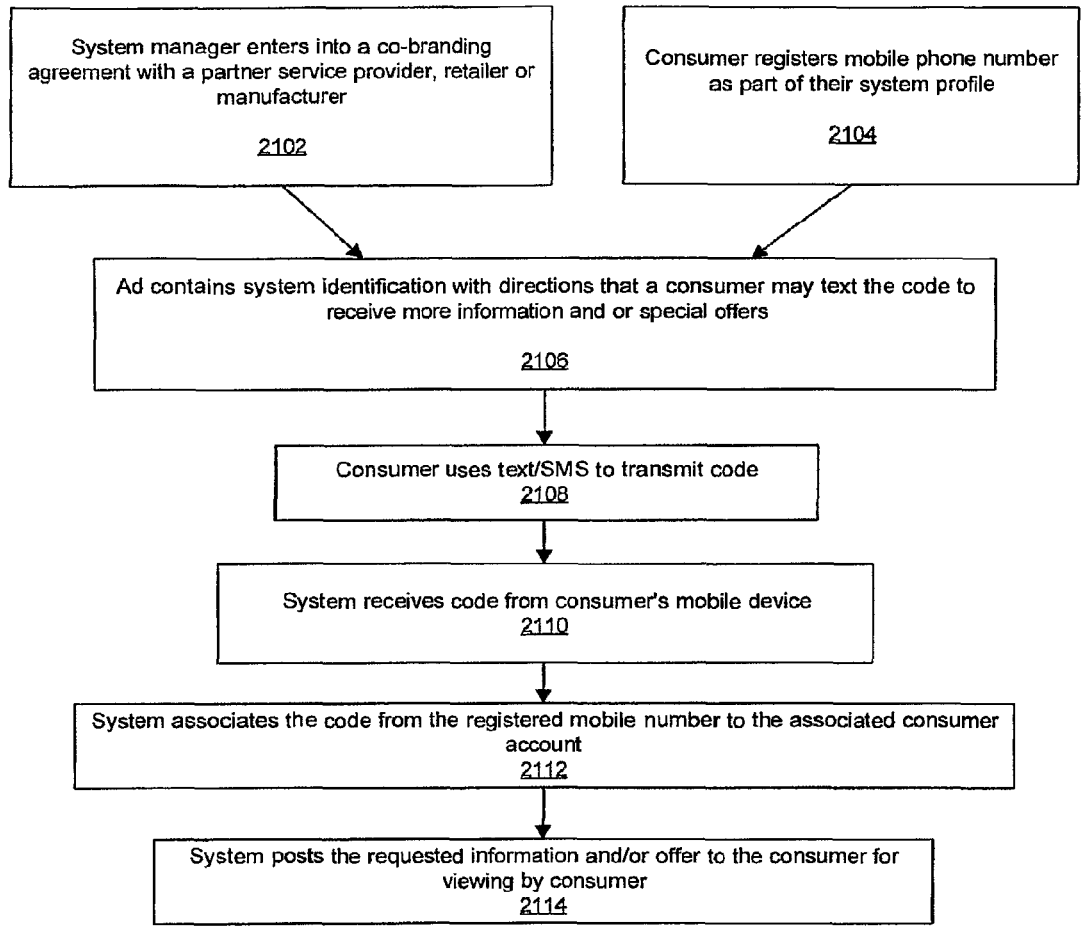
FIG. 21 is an example of a flow diagram illustrating the delivery of special offers and savings to consumer upon the receipt of a short message service text message.

FIG. 21 is an example of a flow diagram illustrating the delivery of special offers and savings to consumers upon the receipt of a short message service text message. As illustrated in FIG. 21, to receive offers via a text message or SMS message request, both the consumer and the retailer (i.e., service provider, retailer and/or manufacturer) must allow for such a transaction to occur. At step 2102 of FIG. 21, the retailer must enter into a co-branding or services agreement with the system 100 manager to offer a text messaging or SMS type campaign. Further, at step 2104, the consumer desiring to use such service must register his/her mobile phone number as part of their personal system profile.

In the illustrated example, when an advertisement is run, it would contain a system logo/identifier and directions that instruct consumer as to how to text a code to the system to receive more information about the advertisement and/or a special offer shown in the advertisement (step 2106). Such advertisements may include print advertisements, such as newspaper, magazine, email, mailing, outdoor advertisement, etc., or may be a radio, television or new media advertisement, among other types. Consumers can then text or SMS to transmit the code to the system manager at step 2108. The system will then receive the code from the user's mobile device at step 2110, match the code associated with the registered mobile number to a consumer account at step 2112 and post the requested information or offer to the consumer's account, step 2114. As illustrated in FIG. 20, the requested information or offer may be posted in the consumer's offer listing. Similar to other offers, as described in connection with FIGS. 10 & 11, the targeting legends/boxes associated with an offer received from a consumer text request or SMS may indicate as such. In this example, the offer is identified as a "My SMS" type offer. The consumer may then delete, save and activate, or do nothing with the offer, among other things, as further discussed above in connection with FIGS. 10 & 11. Other implementations of this feature will also be developed that capture information and offers into a consumers account but allow for this capture to be done with technologies different from using cell phone SMS. One other implementation is that with upcoming generations of television equipment and set top boxes that specific button(s) could be incorporated directly into a remote control device which can capture information into a consumer's account at the push of a button from various ads and commercials.

H. Digital Receipts Feature

As illustrated in FIGS. 10, 12, 14, 16, 18 and 20, the system 100 may include a feature, which in this example, is located in the personal management section 1006 of the consumer interface 1000, that allows the consumer to receive digital receipts detailing his/her purchase with participating service providers, retailers or manufacturers. In this regard, digital receipts itemizing consumer transactions with specific service providers, retails or manufacturers may be visible via a consumer's personal system account. Use of specific payment options, coupons, loyalty cards, universal transaction card, or other means for identifying a consumer may be utilized to trigger the transmission of a digital receipt to a consumer's account. Once received by the system, the customer may search, sort, store, download or print received digital receipts and may even be able to import or copy the digital transaction data into a personal bookkeeping program.

I. On-line Rebate Feature

As illustrated in FIGS. 10, 12, 14, 16, 18 and 20, the system 100 may also include a feature, which in this example is located in the features section 1004 of the consumer interface 1000, that allows a consumer to locate, submit and/or track rebate redemption offers. In this regard, rebate searches can be performed by the system based on product purchases or specific rebate information. On-line or downloadable forms can be provided for rebated submission. Further, rebates may be submitted on-line using digital receipts or other exhibits. Optionally, rebates may be tracked on-line as well.

Those skilled the in art will recognize that it is possible to design a consumer interface 1000 that has a very different look and feel from the example consumer interface illustrated above in connection with FIG. 10-21. According, the example of the consumer interface of FIGS. 10-12 is provided for illustrative purposes only and the invention should not be limited to the illustrated consumer interface 1000 design. Alternative consumer interface designs performing implementation of similar functionality should be considered within the scope of this invention.

As illustrated in FIGS. 1-21 above, the system 100 enables specialized target marketing across multiple channels, including, but not limited to, online, offline, direct marking, etc., and further enables the tracking of consumer spending across multiple channels, including, but not limited to, both on-line and offline purchases of brick and mortar retailers, as well as other on-line and off-line retailers. Accordingly, the system 100 is capable of target marketing to different retailers, service providers and manufacturer, through various channels, including both on-line and offline marketing and sales.

Additionally, while the system 100 may be implemented to allow consumers to initiate and track different retail transaction utilizing individual retailer offers, gift cards, coupon, store savings, etc. As discussed above, the system 100 may also be implemented with a universal transaction identifier associated with each consumer account that is capable of communicating with the system 100 such that specific vender information may be accessible utilizing the universal transaction identifier. Such information, when accessed, may then be applied to a consumer transaction with the associated vendor, through the use of the universal transaction identifier. By way of example, in one implementation, the universals transaction identifier, when used by a consumer, enables the point of sale vendor/retailer to identify the consumer, which allows access to the program, discount and monetary resources available to the consumer, such as gift cards, loyalty programs, saving, etc., as reflected in the system 100, that relate to the transaction as a whole or the items purchased during that transaction.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, persons skilled in the art will understand and appreciate, that one or more processes, sub-processes, or process steps described in connection with FIGS. 1 through 20 may be performed by hardware and/or software. Additionally, a target management and consumer management system, as described above, may be implemented completely in software that would be executed within a processor or plurality of processors in a networked environment. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory (not shown) in the device used to execute the software. The software in software memory may include an ordered listing of executable instructions for implementing logical functions, i.e., "logic" that may be implemented either in digital form such as digital circuitry or source code or optical circuitry or chemical or biochemical in analog form such as analog circuitry or an analog source such an analog electrical, sound or video signal, and may selectively be embodied in any signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (hereinafter, "Signal-Bearing Medium") is any means that may contain, store, communicate, propagate, or transport the program for use by or in connection with the instruction execution system, apparatus, or device. The Signal-Bearing Medium may selectively be, for example but not limited to, an electronic, magnetic, optical, electromagnetic, infrared, or semiconductor system, apparatus, device, air, water, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" "DVD" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated by those skilled in the art that a Signal-Bearing Medium may include carrier wave signals on propagated signals in telecommunication and/or network distributed systems. These propagated signals may be computer, i.e., machine data signals embodied in the carrier wave signal. The computer/machine data signals may include data or software that is transported or interacts with the carrier wave signal. Note also that the implementation may vary between systems. The claims and their equivalents define the scope of the invention.

What is claimed:

1. A computer implemented method performed by an enterprise infrastructure that is networked with partner goods and services providers servers which are partners with an enterprise operating the enterprise infrastructure, the enterprise infrastructure comprising an internal electronic data interchange ("EDI") server farm comprising a plurality of EDI servers and wherein each of the plurality of EDI servers is configured with different applications and permissions than other EDI servers of the plurality of EDI servers, wherein the different applications and permissions increase efficiency in partner data processing and storage, the enterprise infrastructure further comprising one or more processors and non-transitory computer readable memory storing executable instructions, the one or more processors executing the executable instructions to cause the enterprise infrastructure to perform the method comprising:

providing a consumer account on one of the plurality of EDI servers of the enterprise infrastructure, wherein the consumer account is accessible by a consumer via a consumer interface provided on any of a plurality of network terminals, the consumer account corresponding to a unique universal transaction card configured to operate as a plurality of gift cards of a plurality of providers, wherein the plurality of gift cards are accepted by less than all of the partner goods and services providers servers networked with the enterprise infrastructure via EDI VLAN, the EDI VLAN having an interface to access each of the partner goods and services providers servers, wherein the universal transaction card corresponding to the consumer account can be used to purchase goods (i) through a plurality of provider point of sale terminals through the internal EDI server farm and (ii) through the plurality of network terminals by utilizing the internal EDI server farm, wherein the plurality of provider point of sale terminals and the plurality of network terminals are not a part of the enterprise infrastructure;

providing, by the internal EDI server farm, a view on the consumer interface listing a plurality of offers from the partner goods and services provider servers, the plurality of offers being sent by the partner goods and service providers over the partner servers based on information received at the partner servers about the consumer;

receiving, by the internal EDI server farm of the enterprise infrastructure, a universal transaction card identifier and a purchase price for a purchase of a good by the consumer from a first goods and services provider;

determining, by the internal EDI server farm of the enterprise infrastructure, whether the consumer account contains a balance associated with any gift cards associated with the first goods and services provider sufficient to cover the purchase price of the good associated with at least one of the plurality of offers sent by the partner servers;

receiving, by initiating contact between the internal EDI server farm and the partner server associated with the first goods and services provider, from the partner, an indication that the consumer account has sufficient funds in the account with the partner server to cover the purchase price of the good;

in response to receiving the indication, processing, by the internal EDI server farm of the enterprise infrastructure using the internal EDI server farm, a transaction for the purchase of the good wherein the processing requires a reduction in the balance associated with any gift cards associated with the first goods and services provider that are used by the consumer account to complete the transaction.

2. The method of claim 1 further comprising:
generating an item on the consumer interface, the item operable, when selected by the consumer, to send a short message service ("SMS") message requesting that an offer of the plurality of offers be sent from a selected one of the partner goods and services providers to the consumer.

3. The method of claim 1 further comprising:
registering a new gift card, different from the universal transaction card, enabled to make purchases from one of the partner goods and services providers as a gift card associated with the consumer account.

4. The method of claim 1, further comprising providing at least one offer to the consumer relating to the transaction before the transaction is finalized.

5. The method of claim 1, wherein the first partner goods and services provider is designated in the consumer account as the retailer for transactions involving any gift cards during purchase of the universal transaction card identifier according to instructions received at the enterprise infrastructure by the consumer through a consumer interface in network communication with a network terminal.

6. The method of claim 1, further comprising receiving a consumer input to use the balance for the purchase.

7. The method of claim 1, further determining, by the enterprise infrastructure, the universal transaction identifier is accepted by the first goods and services provider.

8. The method of claim 1, wherein the consumer account is accessible by a consumer via a mobile phone.

\* \* \* \* \*